(12) United States Patent
Tsumura et al.

(10) Patent No.: US 6,237,510 B1
(45) Date of Patent: May 29, 2001

(54) COMBUSTION BURNER AND COMBUSTION DEVICE PROVIDED WITH SAME

(75) Inventors: Toshikazu Tsumura; Kenji Kiyama; Tadashi Jimbo, all of Kure; Shigeki Morita, Hiroshima; Koji Kuramashi, Kure; Kunio Okiura, Kure; Shinichiro Nomura, Kure; Miki Mori, Kure; Noriyuki Ohyatsu, Kure; Noboru Takarayama, Kure; Toshihiko Mine, Kure; Hironobu Kobayashi; Hirofumi Okazaki, both of Hitachi, all of (JP)

(73) Assignee: Babcock-Hitachi Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/043,425

(22) PCT Filed: Apr. 30, 1997

(86) PCT No.: PCT/JP97/01488
§ 371 Date: Mar. 19, 1998
§ 102(e) Date: Mar. 19, 1998

(87) PCT Pub. No.: WO98/03819
PCT Pub. Date: Jan. 29, 1998

(30) Foreign Application Priority Data

| Jul. 19, 1996 | (JP) | 8-190757 |
| Feb. 7, 1997 | (JP) | 9-025637 |
| Feb. 7, 1997 | (JP) | 9-025638 |
| Feb. 7, 1997 | (JP) | 9-025640 |
| Feb. 10, 1997 | (JP) | 9-027055 |

(51) Int. Cl.⁷ .................. F23C 1/10; F23D 1/00
(52) U.S. Cl. ............ 110/262; 110/263; 110/234; 110/347; 431/188; 431/284
(58) Field of Search ............. 110/104 B, 260, 110/261, 262, 263, 264, 265, 347, 234; 431/188, 284, 285, 8; 122/2

(56) References Cited

U.S. PATENT DOCUMENTS

| 4,726,760 | * | 2/1988 | Skoog | 431/8 |
| 4,807,541 | * | 2/1989 | Masai et al. | 110/262 |
| 4,907,962 | * | 3/1990 | Azuhata et al. | 431/284 X |
| 4,915,619 | * | 4/1990 | LaRue | 110/264 X |
| 5,090,339 | * | 2/1992 | Okiura et al. | 110/263 |
| 5,231,937 | * | 8/1993 | Kobayashi et al. | 110/262 |
| 5,263,426 | * | 11/1993 | Morita et al. | 110/347 X |
| 5,403,181 | * | 4/1995 | Tanaka et al. | 431/8 |
| 5,806,443 | * | 8/1998 | Kobayashi et al. | 110/264 X |
| 6,116,171 | * | 9/2000 | Oota et al. | 110/263 X |

FOREIGN PATENT DOCUMENTS

| 0 315 802 A1 | * | 5/1989 | (EP) . |
| 672863 | | 9/1995 | (EP) . |
| 1158600 | * | 7/1969 | (GB) | 431/8 |
| 55-140007 | * | 11/1980 | (JP) . |
| 59-208305 | * | 11/1984 | (JP) . |
| 60-171307 | * | 9/1985 | (JP) . |
| 60-171310 | * | 9/1985 | (JP) | 431/8 |
| 61-89614 | * | 6/1986 | (JP) . |
| 61-285312 | * | 12/1986 | (JP) . |
| 62-909 | * | 1/1987 | (JP) . |
| 4-214102 | * | 8/1992 | (JP) . |
| 8-135919 | * | 5/1996 | (JP) . |

* cited by examiner

Primary Examiner—Ira S. Lazarus
Assistant Examiner—Ljiljana V. Ciric
(74) Attorney, Agent, or Firm—Antonelli, Terry, Stout & Kraus, LLP

(57) ABSTRACT

A combustion burner includes a mixture nozzle (2) defining a mixture fluid passage through which a mixture fluid (1) containing pulverized coal and conveyor gas flows toward a furnace, secondary and tertiary air passages surrounding the mixture nozzle (2), through which secondary air (6) and tertiary air (9) for combustion purposes flow, respectively; and air injection nozzles (24) provided in the vicinity of an outer periphery of a distal end of the mixture nozzle (2). The air (21) is injected from the air injection nozzles (24) toward the axis of the mixture nozzle, so that the high-temperature gas in the vicinity of the outer periphery of the distal end of the mixture nozzle (2) is drawn into the mixture fluid (1) in the vicinity of the outer periphery of this distal end.

38 Claims, 20 Drawing Sheets

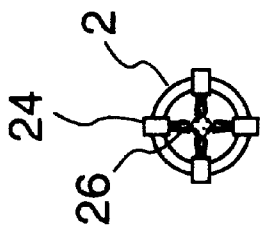
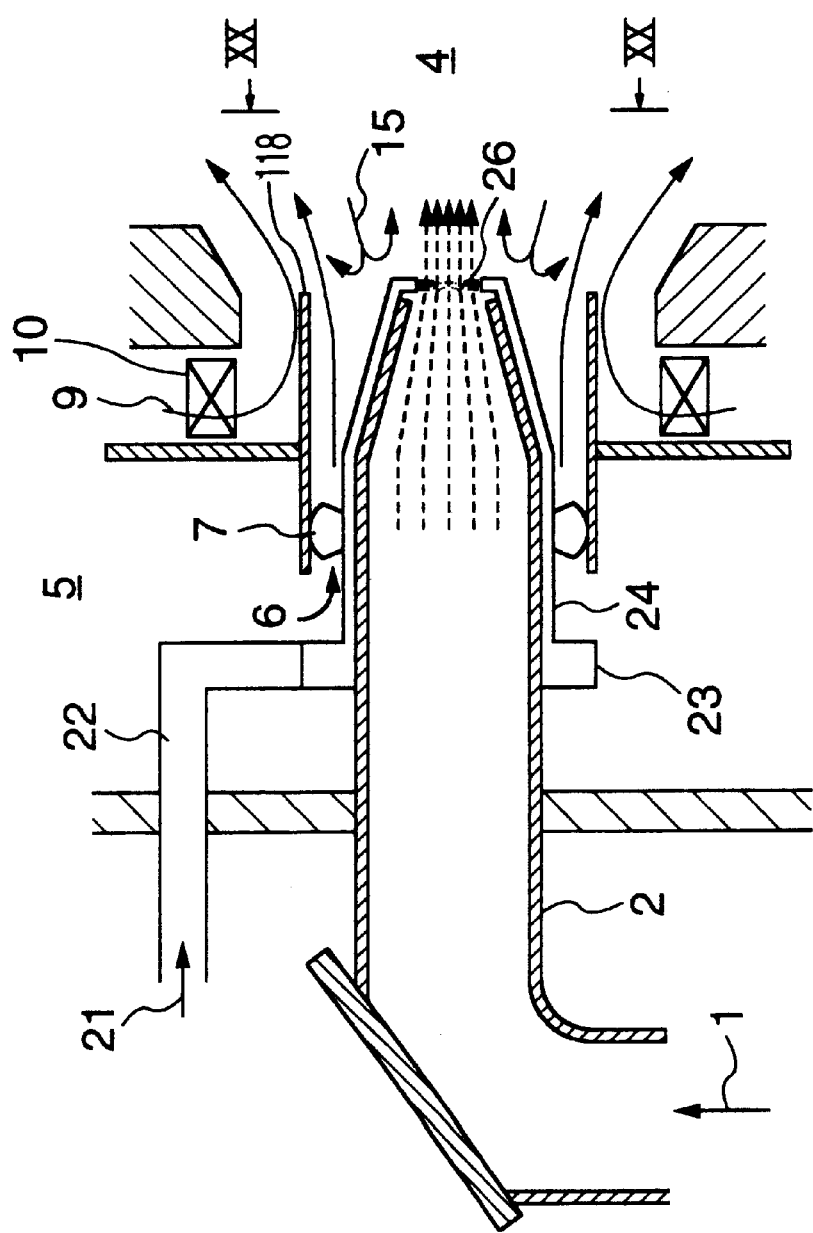

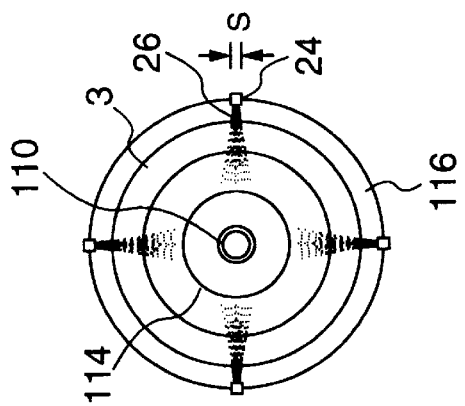
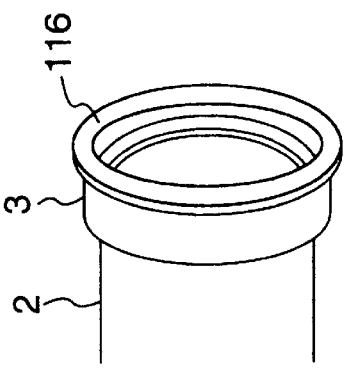
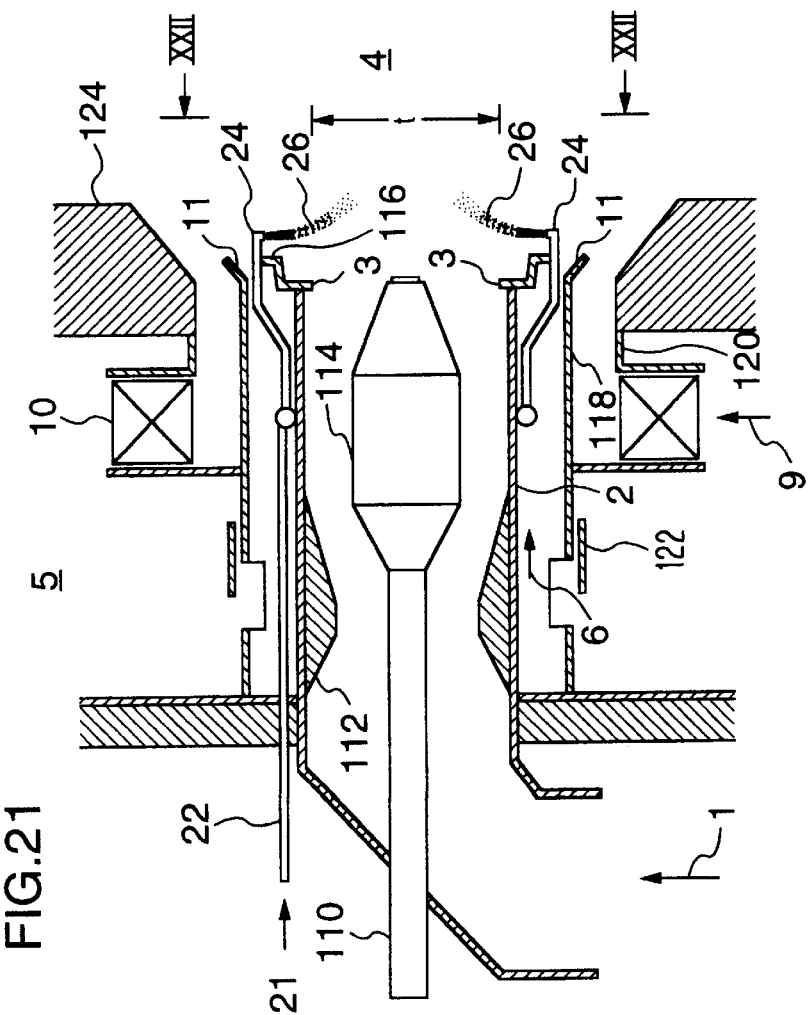

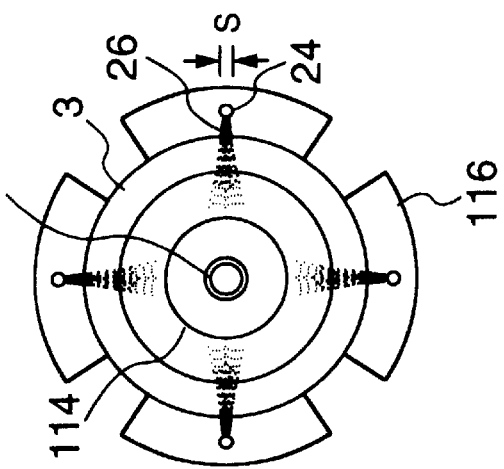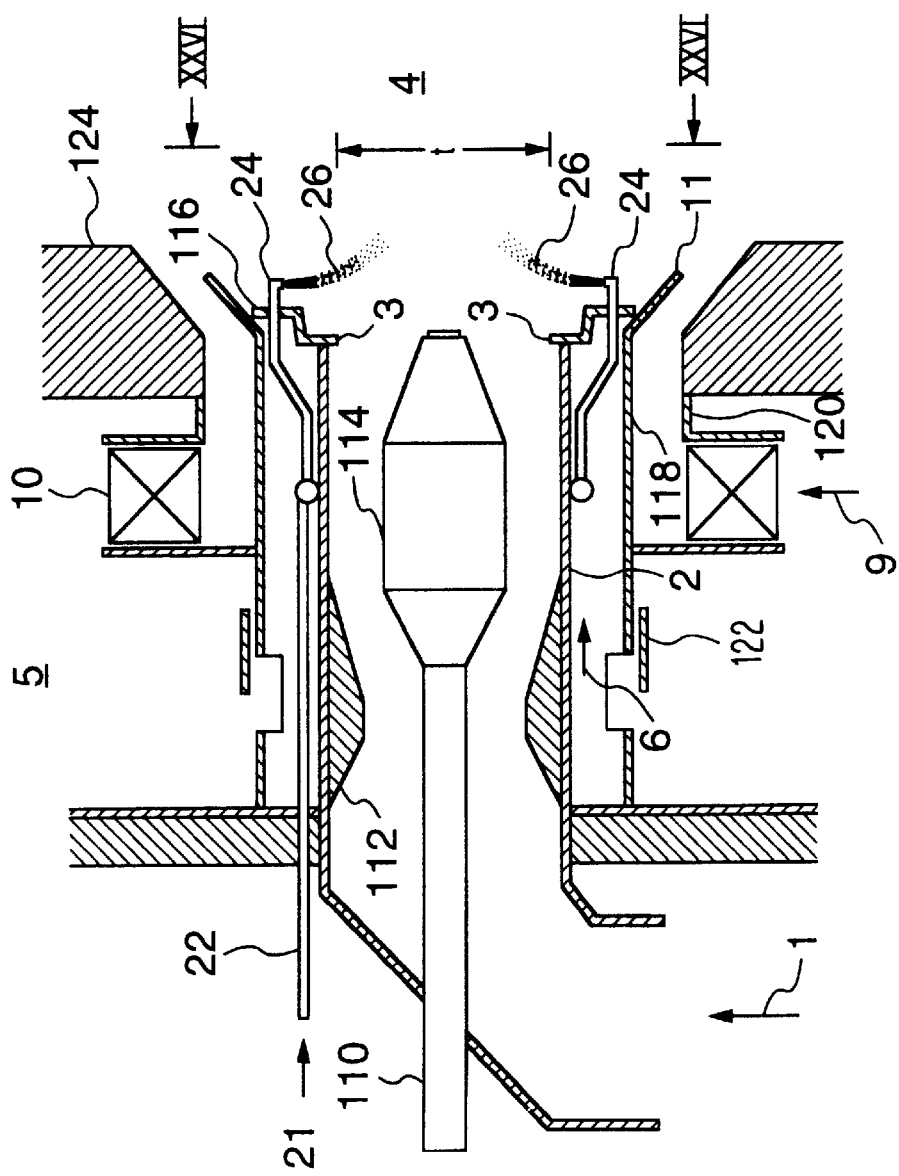

COMBUSTION BURNER AND COMBUSTION DEVICE PROVIDED WITH SAME

TECHNICAL FIELD

This invention relates to a combustion burner. This invention also relates to a combustion apparatus provided with a combustion burner, such as a boiler, a heating furnace and a hot blast-producing furnace.

BACKGROUND ART

A combustion burner of the type described comprises a mixture nozzle defining a mixture fluid passage through which a mixture fluid, containing solid fuel and primary gas for transferring purposes, flows toward a furnace, and a gas supply nozzle defining a gas passage through which secondary gas or secondary and tertiary gases flow. The secondary and the tertiary gases flow to surround the mixture gas. An oil burner for ignition purposes is provided within the mixture nozzle.

In a conventional combustion burner, a flame stabilizer ring is provided in the vicinity of an outlet end of the mixture nozzle, and the secondary and the tertiary gases are swirled by swirl-producing devices, and are injected from the gas supply nozzles.

During the operation of the combustion burner, a reduction region, including an ignition region and an unignition region inside the ignition region, is formed in the vicinity of the outlet of the mixture nozzle, and further an air-rich region, containing a larger amount of oxygen, is formed to surround the reduction region. By enhancing the combustion rate at the reduction region, the low-NOx combustion can be achieved.

Recently, combustion burners have been required to achieve the low-NOx combustion, and also have been required to have a large capacity. As a result, the diameter of the mixture nozzle of the combustion burners has been increased.

When the diameter of the mixture nozzle increases, the ignition region of the reduction region is relatively decreased accordingly. As a result, the low-NOx combustion in the reduction region is suppressed.

DISCLOSURE OF INVENTION

It is therefore an object of this invention to provide a combustion burner which can achieve the low-NOx combustion even if the combustion burner has a large capacity.

To this end according to the present invention, there is provided a combustion burner comprising: a mixture nozzle defining a mixture fluid passage through which a mixture fluid, containing powdered solid fuel and transfer gas for transferring the solid fuel, flows toward a furnace; a gas passage surrounding the mixture nozzle, through which oxygen-containing combustion gas flows; and means for directing high-temperature gas, present in the vicinity of an outer periphery of a distal end of the mixture nozzle, into the mixture fluid.

BRIEF DESCRIPTION OF THE DRAWINGS

FIG. 19 is a vertical cross-sectional view showing a further embodiment of a combustion burner of the invention;

FIG. 20 is a front-elevational view as seen along the line XX—XX of FIG. 19;

FIG. 21 is a vertical cross-sectional view showing a further embodiment of a combustion burner of the invention;

FIG. 22 is a front-elevational view as seen along the line XXII—XXII of FIG. 21;

FIG. 24 is a perspective view showing a secondary air separation disk shown in FIG. 21;

FIG. 25 is a vertical cross-sectional view showing a further embodiment of a combustion burner of the invention;

FIG. 26 is a front-elevational view as seen along the line XXVI—XXVI of FIG. 25;

BEST MODE OF CARRYING OUT THE INVENTION

Figure 1:
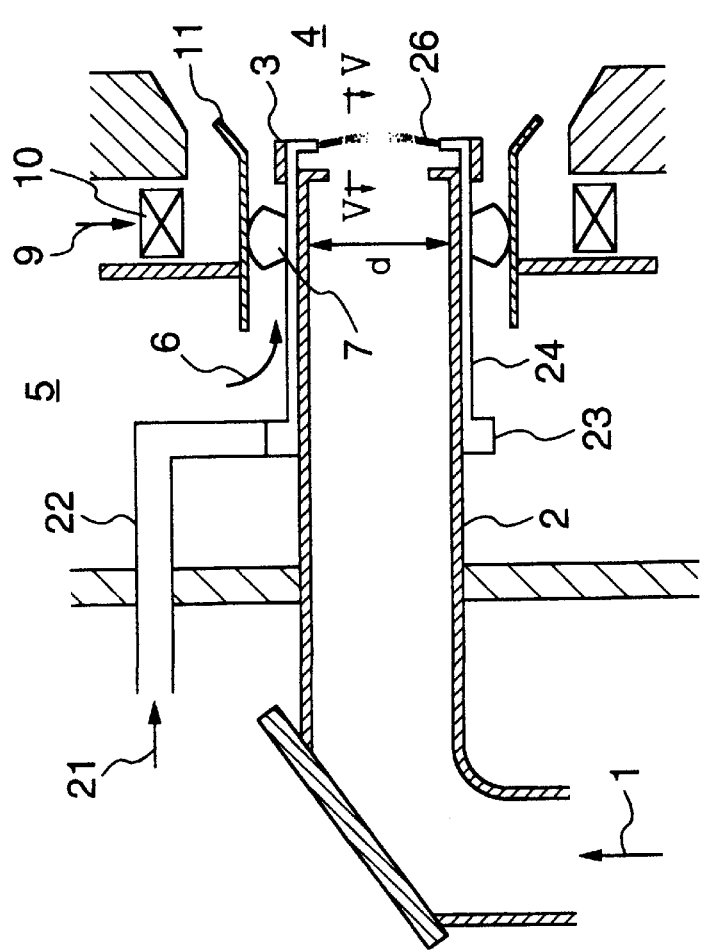
FIG. 1 is a vertical cross-sectional view of one preferred embodiment of a combustion burner of the present invention.

In a combustion burner shown in FIG. 1, a mixture fluid 1, containing fine pulverized fuel coal and conveyor air, is supplied to a furnace 4 through a mixture fluid passage defined by a mixture nozzle 2. A flame stabilizer ring 3 is provided at a distal end of the mixture nozzle 2, an outer peripheral portion of which the flame stabilizer ring 3 has an L-shaped cross-section.

Combustion air (secondary air 6 and tertiary air 9) is supplied from a wind box 5 to a region around the outer periphery of the mixture nozzle 2. Swirl-producing devices 7 and 10 impart suitable swirls respectively to the secondary air 6 and the tertiary air 9, so that the optimum condition for low-NOx combustion is obtained.

The tertiary air 9 is further spread outwardly or flared by a guide plate 11, so that a central portion of a flame is rendered into an air-lean condition, that is, in a fuel-rich condition. Before the outer periphery air is mixed with the mixture fluid 1, the combustion rate of the fuel is enhanced at a reduction region so that the low-NOx combustion can be achieved.

Here, the air 21 is used as internal flame stabilization gas, and is fed through an internal flame stabilization gas supply pipe 22 to a header 23 disposed within the wind box 5. The internal flame stabilization air 21 is further fed to the distal end of the mixture nozzle 2 through four nozzles 24. The air 21 is injected from four injection ports 25, disposed adjacent to the flame stabilizer ring 3, toward a center portion of the mixture nozzle 2, so that four air jets 26 are formed.

Figure 5:
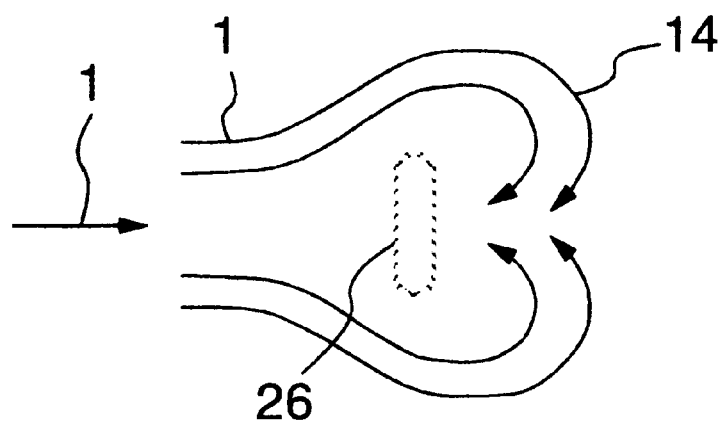
FIG. 5 is a cross-sectional view taken along the line V—V of FIG. 1.

As shown in FIG. 5, each of the air jets 26 serves as like a rigid flame stabilizer, and forms circulation flows 14 at its downstream side, thereby enabling the ignition and flame stabilization.

Figure 6:
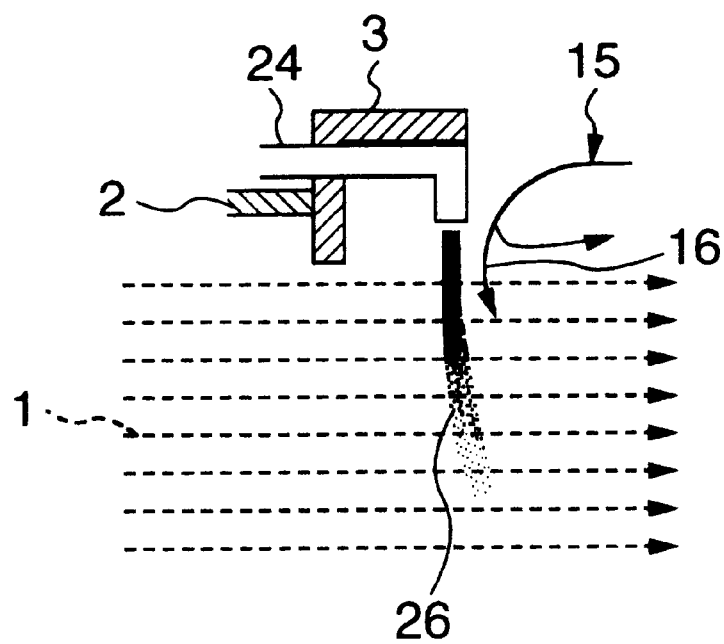
FIG. 6 is a fragmentary cross-sectional view showing an outer peripheral portion of a flame stabilizer ring shown in FIG. 1.

As shown in FIG. 6, recirculation high-temperature gas 15 is present immediately downstream of the flame stabilizer ring 3, and promotes the ignition and flame stabilization in the vicinity of the flame stabilizer ring 3. The air jets 26, injected respectively from the injection ports 25 of the internal flame stabilization air nozzles 24 toward the center portion of the mixture nozzle 2, achieve a carrying action, and therefore part 16 of the recirculation hot gas 15 flows along the air jets 26 into the mixture fluid 1, so that the ignition and flame stabilization performance therein is enhanced. Since the disturbance of the mixture fluid is increased by the air jets 26, the combustion efficiency after the ignition is enhanced.

If the flow velocity of the air jets 26 is low, the air jets 26 are deflected by the flow of the mixture fluid 1, and therefore the arrival of the air jets 26 at the center portion of the mixture nozzle 2 is delayed. In order to increase the ignition region, it is preferred that the flow velocity of the air jets 26 is not less than 3 times higher than the flow velocity of the mixture fluid 1.

Figure 3:
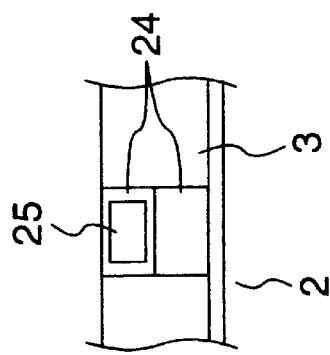
FIGS. 3 and 4 are fragmentary cross-sectional views taken respectively along the line III—III and the line IV—IV of FIG. 2.
Figure 4:
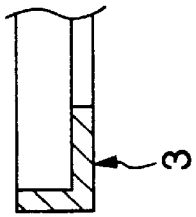
Figure 2:
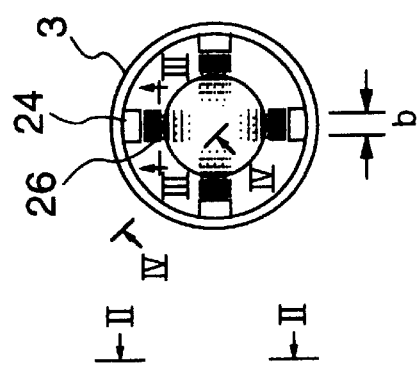
FIG. 2 is a front-elevational view as seen along the line II—II of FIG. 1.

If the ratio of the sum of the widths of the air jets 26 in the peripheral (circumferential) direction to the peripheral length of the outlet of the mixture nozzle 2 is large, most of the pulverized coal to be ignited are forced to the center portion of the mixture nozzle 2, so that the ignition and flame stabilization performance is lowered. When the inner diameter of the mixture nozzle 2 is represented by d (FIG. 1), and the width of each flame stabilization air jet 26 is represented by b (FIG. 2), the peripheral length of the outlet of the mixture nozzle 2 is represented by $\pi d$, and the sum of the widths of the air jets in the peripheral direction is represented by $4b$, and therefore it is preferred that the following formula is established:

$$\pi d/40 \leq b \leq \pi d/8$$

Figure 7:
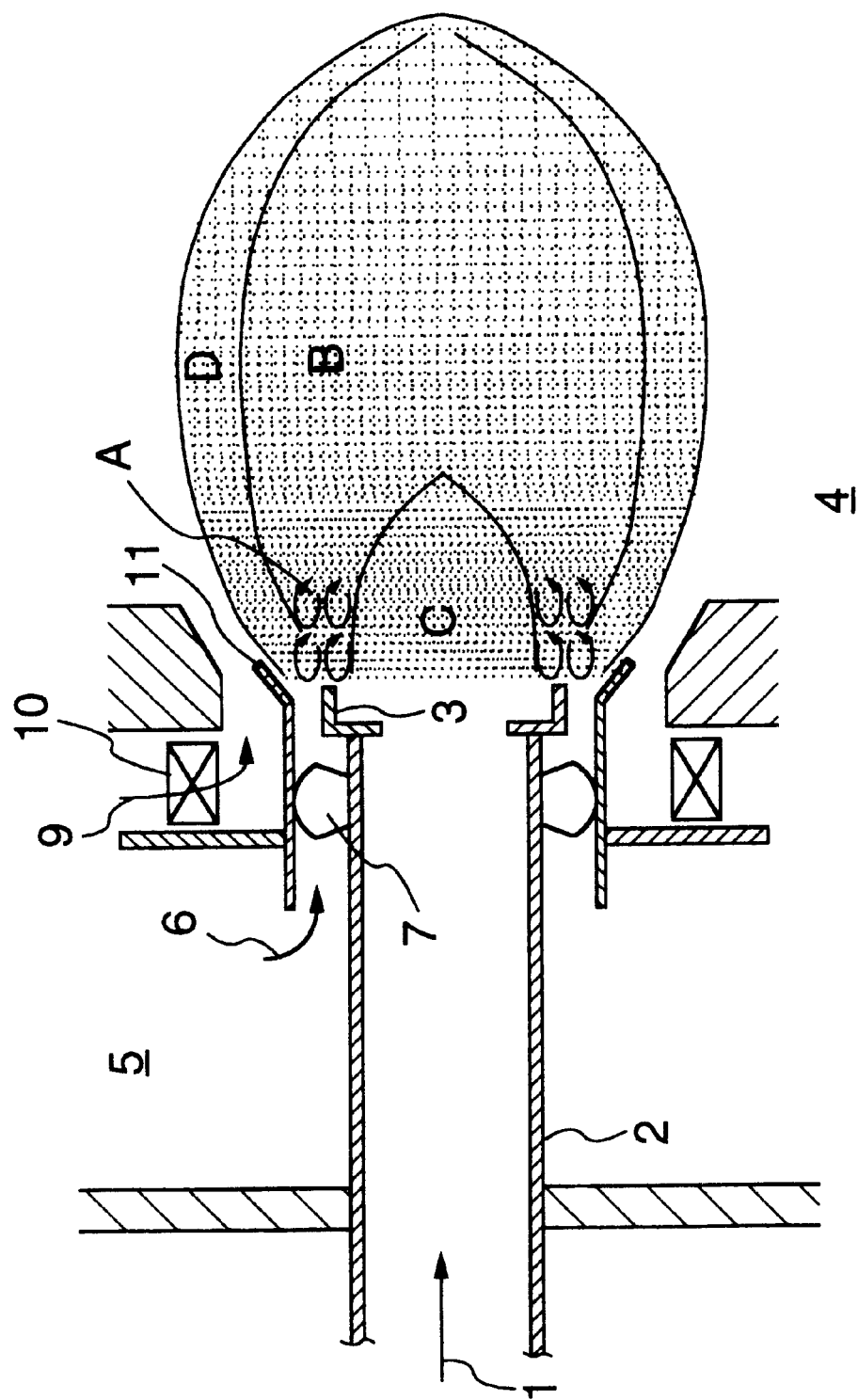
FIG. 7 is a cross-sectional view showing a flame of the burner shown in FIG. 1.

A negative pressure portion can be formed in the flow of the mixture fluid 1 by the air jets 26, and a disturbance is produced in the negative pressure portion of the mixture fluid, and due to the hot gas-carrying action of the air jets 26, in an non-ignition region C (FIG. 7) of the mixture fluid at the distal end of the mixture nozzle 2, the ignition and flame stabilization is promoted.

The negative pressure portion is formed in the flow of the mixture fluid by injecting the air radially inwardly from the four air nozzles 24, provided adjacent to the outer periphery of the distal end portion of the mixture nozzle 2, toward the center of the mixture nozzle 2.

The ignition region in the unignition region C (FIG. 7) is increased without delaying the arrival of the air jets at the center portion of the mixture fluid, provided that the flow velocity of the air jets from the air nozzles 24 is made not less than three times higher than the flow velocity of the mixture fluid. If the sum of the widths of the injection ports of the air nozzles 24 is in the range of between 10% and 50% of the peripheral length of the distal end of the mixture nozzle, the mixture fluid to be ignited will not be unduly forced to the center portion of the primary nozzle, and therefore the satisfactory ignition and flame stabilization performance in the unignition region C (FIG. 7) due to the gas jets can be achieved.

Figure 8:
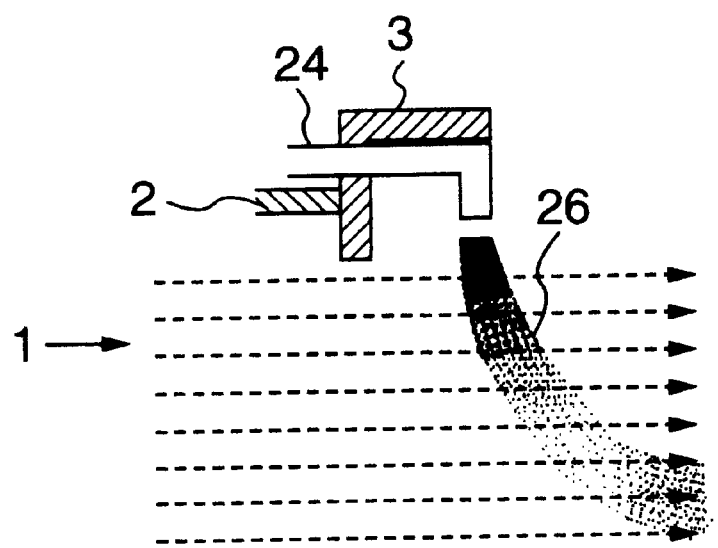
FIG. 8 is a view showing the flow of a mixture fluid in the vicinity of an injection nozzle shown in FIG. 1.

When the direction of injection of the air from each air nozzle 24 is perpendicular to the direction of flow of the mixture fluid 1, the air from the injection port 25 actually forms the air jet 26 as shown in FIG. 8 because of the flow of the mixture fluid 1, and an ignition and flame stabilization region is formed at a region of the boundary (which is disposed slightly downstream of the outlet of the mixture nozzle 2) between this gas jet 26 and the flow of the mixture fluid 1.

Figure 9:
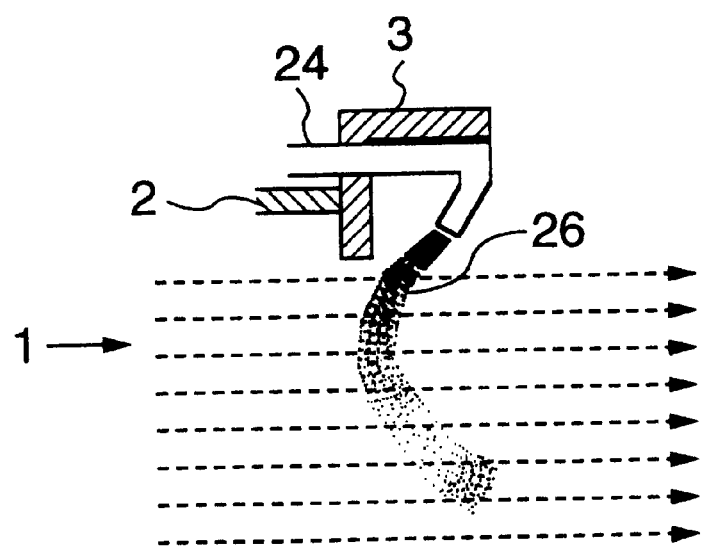
FIG. 9 is a view showing the flow of a mixture fluid in the vicinity of a modified injection nozzle.

When the direction of injection of the air from each air nozzle 24 is directed toward the upstream side in the mixture nozzle 2 as shown in FIG. 9, the air jet 26 injected from the air nozzle 24 is forced back to the outlet of the mixture nozzle 2 by the flow of the mixture fluid 1, so that an ignition and flame stabilization region is formed at the outlet of the mixture nozzle 2.

Figure 10:
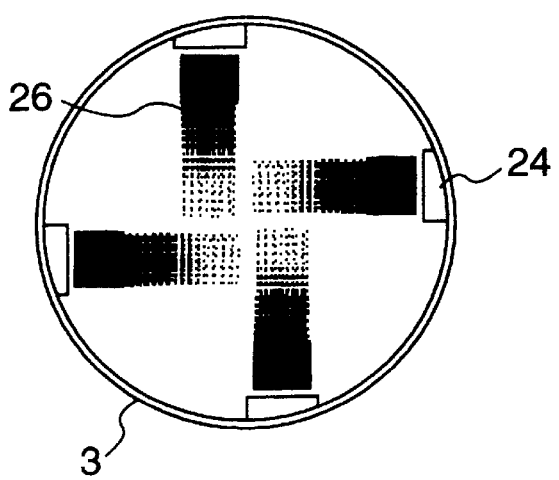
FIGS. 10 to 12 are views showing modified arrangements of the injection nozzles, respectively.
Figure 11:
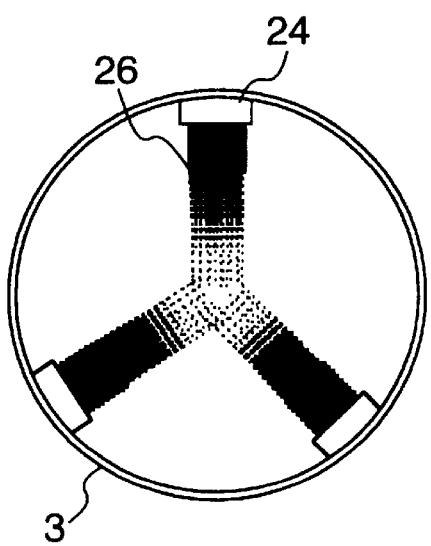
Figure 12:
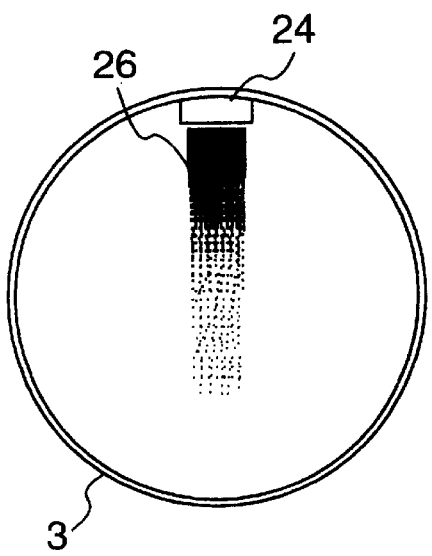

If injection port 25 of each air nozzles 24 is swingable about the axis of the air nozzle 24 and/or an axis perpendicular to the axis of the air nozzle 24, or axially movable, the air can be injected from the optimum position in the optimum direction, depending on the configuration of the burner, the nature of the fuel, a boiler load and so on. The number and the arrangement of the air nozzles 24 are not limited to those described above, but can be modified as shown in FIGS. 10 to 12.

Figure 13:
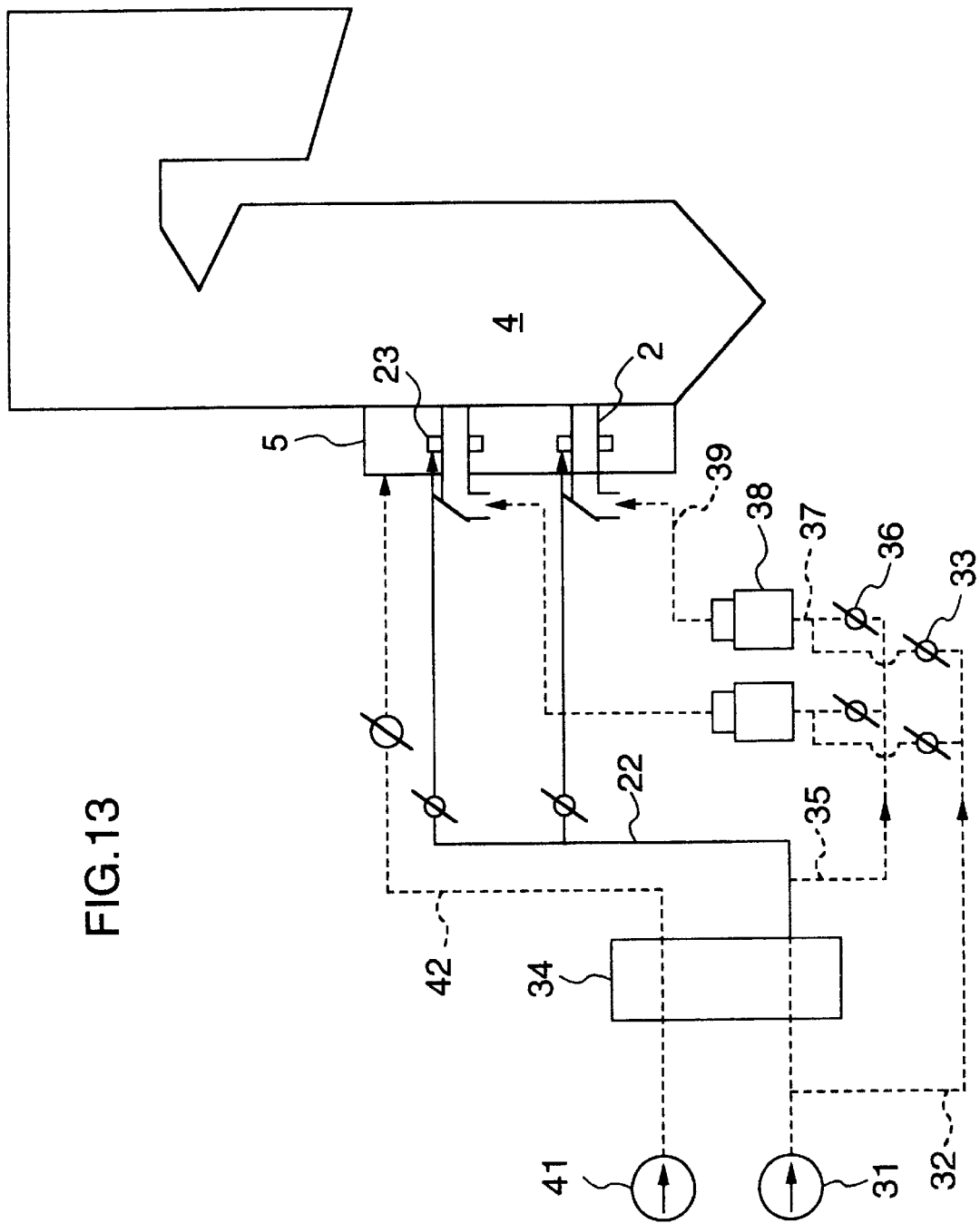
FIG. 13 is a diagram showing a boiler using the burners shown in FIG. 1.

In a boiler, shown in FIG. 13 using the combustion burners of this embodiment, part of the air supplied from a primary air fan 31 passes through an air preheater 34 and the remainder by-passes the air preheater 34. The air bypassing the air preheater 34 is supplied to the burners via a primary cold air duct 32 and the air passing through the air preheater 34 is supplied to the burners via a primary hot air duct 35. The air passing through the air preheater 34 and the air by-passing the air preheater 34 are controlled in flow rate by the respective flow control dampers 33 and 36 and then are fed to a mill 38 via a mill inlet primary air duct 37 so that an outlet temperature of the coal mill 38 can become a predetermined value.

Coal (fine pulverized coal) pulverized and dried is fed together with the conveyor air to the associated burner via a coal feed pipe 39, and is further supplied to the furnace 4 via the mixture nozzle 2. Other necessary air (combustion air) is supplied from a combustion air fan 41. After the air is heated by the air preheater 34, it is fed to the wind box 5 via a combustion air duct 42 and supplied to the furnace 4 via the burners.

The internal flame stabilization air 21 branches off from a primary air supply line at the outlet side of the air preheater 34, and is fed to each internal flame stabilization air header 23 via the internal flame stabilization air supply pipe 22. The subsequent supply system is as shown in FIG. 1. The conveyor air is fed under higher pressure than the combustion air is, and is suited as the internal flame stabilization air. Since the hot air from the air preheater 34 is used as the internal flame stabilization air, there is achieved an advantage that the mixture fluid is heated, so that the combustion efficiency is enhanced.

By supplying the internal flame stabilization air to the mixture nozzle 2 only during the operation of the burner, the object of the present invention can be achieved. Therefore, in combustion facilities having a plurality of burners, in case that the internal flame stabilization air is supplied during the operation of the burners and is stopped during out of operation of the burners, the amount of power for supplying the high-pressure air can be reduced. This is advantageous from the viewpoint of the efficiency.

When the burner load is low, the flow velocity of the mixture fluid 1 is lowered, and therefore the flow velocity of the internal flame stabilization air may be low. By adjusting the amount of the internal flame stabilization air in accordance with the burner load or the boiler (equivalent to the burner load), there can be achieved the operation of high efficiency in which the amount of power required for the supplying the internal flame stabilization air is kept to a minimum.

The internal flame stabilization air may be supplied by a fan for exclusive purposes. In this case, since the optimum supply pressure can be set for the internal flame stabilization air, the operation, which is efficient from the viewpoint of the power, can be achieved. In this case, also, either of the low-temperature air upstream of the air preheater 34 (FIG. 13) and the hot (high-temperature) air downstream of the air preheater 34 may be supplied. In this case, by supplying the hot air downstream of the air preheater 34 during the operation of the burners, the pulverized coal and the mixture fluid 1 can be heated after the injection of the internal flame stabilization gas, thereby enhancing the combustion efficiency, and by supplying the low-temperature air upstream of the air preheater 34 when the burners are stopped, the outlet portions of the burners can be cooled, thereby suppressing the influence of the radiation heat from the furnace 4.

Oxygen-rich air, having the oxygen concentration of not less than 21%, may be used as the internal flame stabilization air. In this case, the ignition and flame stabilization performance is further enhanced, so that the low-NOx combustion of high efficiency is further promoted.

The present invention can be applied to other burner structures.

Figure 15:
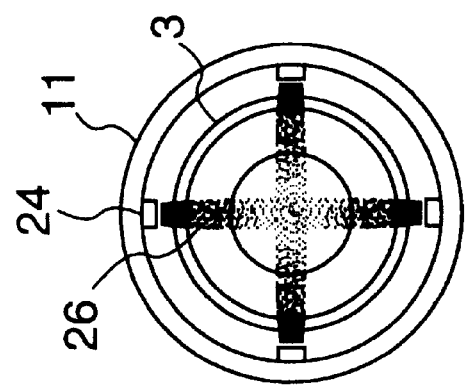
FIG. 15 is a front-elevational view as seen along the line XV—XV of FIG. 14.
Figure 14:
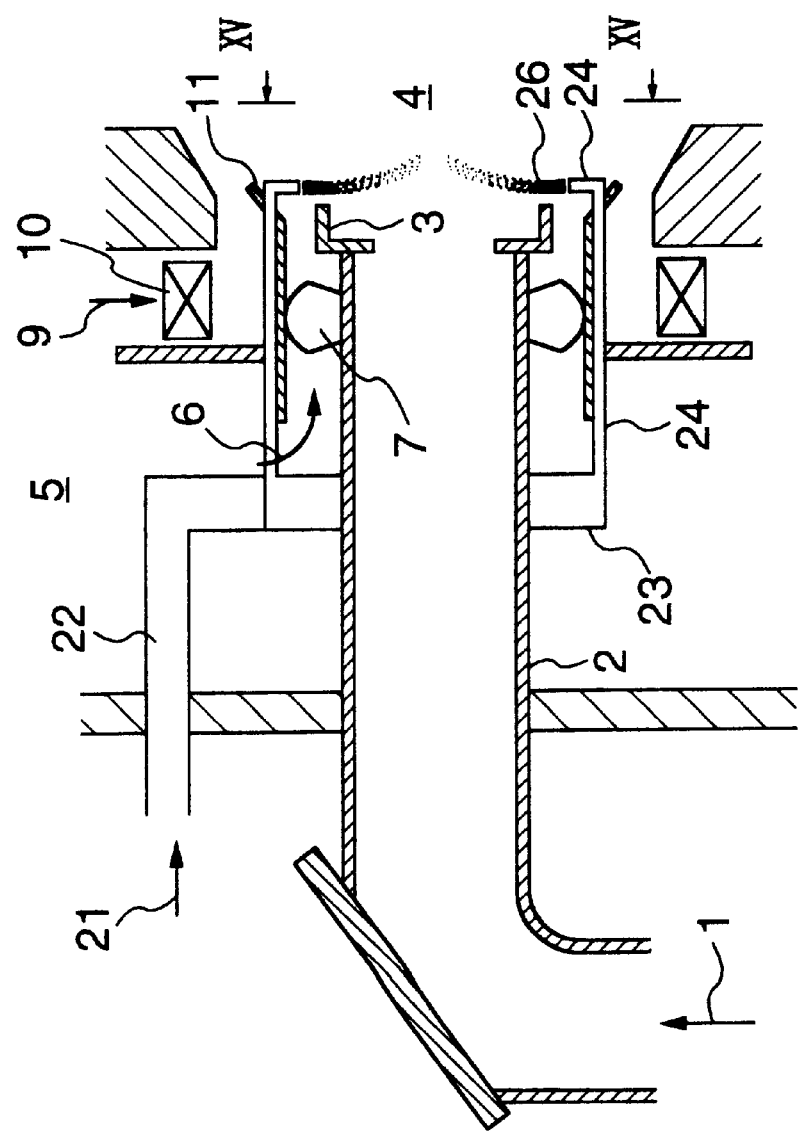
FIG. 14 is a vertical cross-sectional view showing another embodiment of a combustion burner of the invention.
Figure 17:
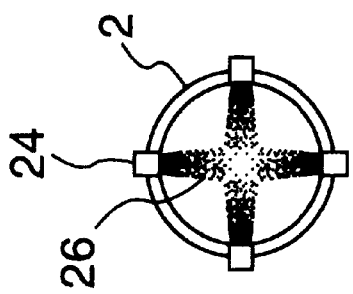
FIG. 17 is a front-elevational view as seen along the line XVII—XVII of FIG. 16.

In a burner shown in FIG. 14, nozzles 24 extend through a tertiary air guide plate 11 to provide four flame stabilization air jets 26 (FIG. 15).

Figure 16:
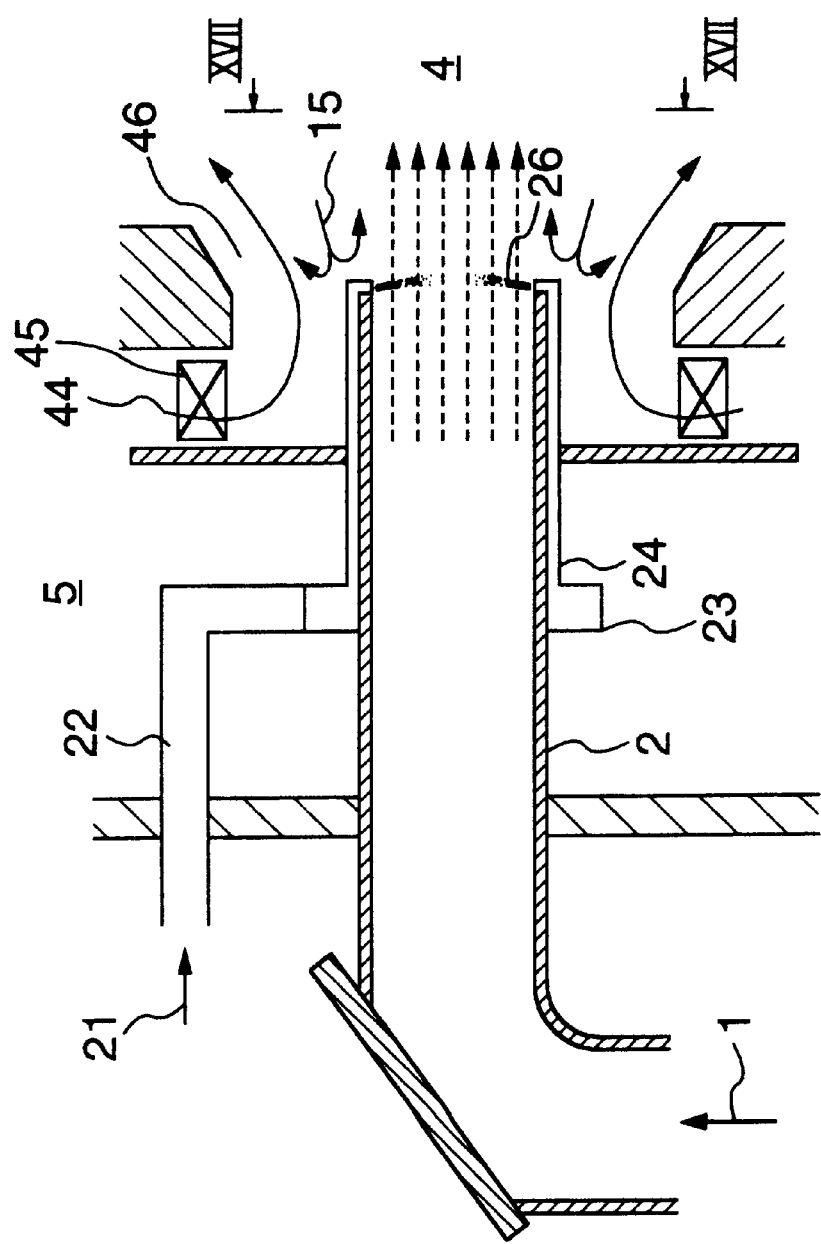
FIG. 16 is a vertical cross-sectional view showing a further embodiment of a combustion burner of the invention.

In a burner shown in FIG. 16, a single combustion air supply passage 46 is provided around the outer periphery of a mixture nozzle 2. In this burner structure, particularly when swirls are imparted to the combustion air, recirculation flows 15 of hot gas are generated between the flow of the mixture fluid 1 and the flow of the combustion air 44, and therefore the effects of the present invention are promoted.

Figure 18:
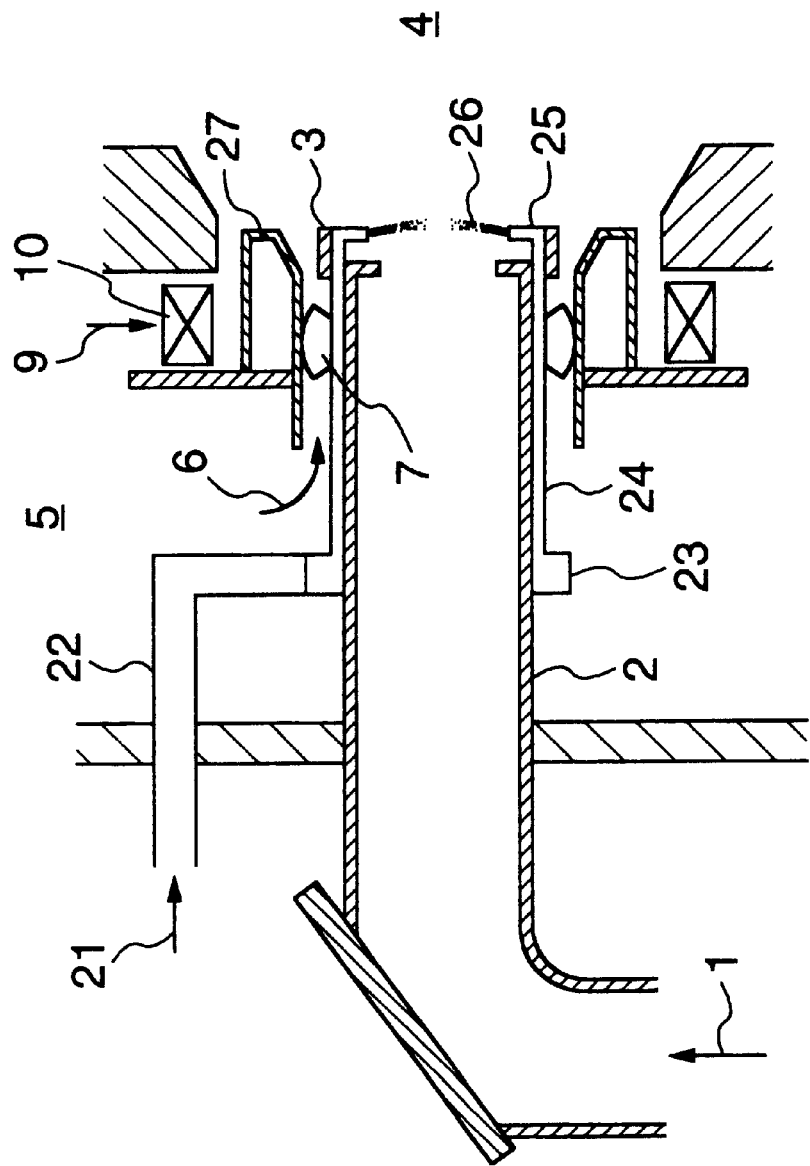
FIG. 18 is a cross-sectional view showing a further embodiment of a combustion burner of the invention.

In a burner shown in FIG. 18, as compared with the burner shown in FIG. 1, there is provided a separator 27 separating the secondary air 6 from the tertiary air 9. In this example, the mixing of the mixture fluid 1 with the outer periphery air is delayed in accordance with the spreading of the flow of the mixture fluid 1, thereby maintaining the reduction of NOx in the vicinity of the burner.

In a burner shown in FIG. 19, a flow passage area of a distal end portion of a mixture nozzle 2 is decreasing progressively toward an outlet thereof. Air nozzles 24 extend along the mixture nozzle 2. The flow of the mixture fluid 1 is directed toward the center portion (that is, the axis) of the mixture nozzle 2, and the secondary air 6 and the tertiary air 9 are swirled outwardly, and therefore recirculation flows 15 are generated between the flow of the mixture fluid 1 and the flows of the combustion air 6 and 9, so that the effects of the present invention is promoted.

A burner shown in FIG. 21 comprises a mixture nozzle 2 through which mixture gas (fine pulverized coal flow) 1 composed of pulverized coal (fuel) and conveyor air (primary air) passes, a Venturi 112 formed on an inner peripheral surface of the mixture nozzle 2 for constricting the flow of the pulverized coal flow 1 so as to prevent a backfire, a pulverized coal concentration-adjusting device 114 provided at a distal end of an oil burner 110 extending within the mixture nozzle 2 toward a furnace 4 for adjusting a concentration distribution of the pulverized coal particles in the pulverized coal flow 1, a flame stabilizer ring 3 provided at a distal end of the mixture nozzle 2 for igniting the pulverized coal in the pulverized coal flow 1 and for stabilizing a flame, a secondary air separation annular disk 116 which enhances the ignition and flame stabilization and has the effect of separating the flame of the burner from the secondary air 6, gas injection nozzles 24 for injecting a gas 21 from a gas supply pipe 22 into the furnace 4 to bring the hot gas in the vicinity of the flame stabilizer ring 3 to the center portion of the burner, a secondary sleeve 118 forming a passage around the outer periphery of the mixture nozzle 2, through which passage the secondary combustion air passes, a guide 11 formed in a flaring manner at a distal end of the secondary sleeve 118, a tertiary sleeve 120 cooperating with the secondary sleeve 118 to form therebetween a passage for tertiary combustion air 9, a secondary air damper 122 for controlling the amount of the secondary air to be supplied, and a tertiary air resistor 10 for controlling the tertiary air 9 to be supplied and for controlling the swirling force of the tertiary air 9 supplied to the outer periphery of the burner flame. The secondary air and the tertiary air are supplied from a wind box 5, and these burner constituent members are provided to be exposed to a burner throat 124.

In this burner, the mixture gas 1 (pulverized coal flow) composed of the fine pulverized coal and the primary air is supplied to the mixture nozzle 2. The pulverized coal flow is constricted by the Venturi 112 and therefore the concentration of the pulverized coal particles in the pulverized coal flow 1 is increased in the vicinity of the flame stabilization ring 3 because of the provision of the pulverized coal concentration-adjusting device 114. The ignition of the pulverized coal and the flame stabilization are effected in the vicinity of the ring 3. At this time, a negative pressure portion of the pulverized coal flow 1 is generated immediately downstream of the flame stabilizer ring 3. A part of the secondary air 6 and the pulverized coal flow 1 in the mixture nozzle 2 are drawn into this negative pressure portion, thereby forming an ignition region of the pulverized coal flow 1. Hot gas is produced at the ignition region, and this hot gas is flowed into the pulverized coal flow 1 by jets 26 of gas (here, air) injected respectively from the gas injection nozzles 24 toward the center portion of the mixture nozzle 2, thereby reducing an non-ignition region of the combustion gas to provide an ignition region, thus enhancing the flame stabilization ability of the burner.

As one means for enhancing the fuel ignition and flame stabilization performance in the vicinity of the flame stabilizer ring 3, the pulverized coal concentration-adjusting device 114 is provided at the center portion of the mixture nozzle 2. The pulverized coal concentration-adjusting device 114 is mounted on the outer peripheral surface of the distal end portion of the oil burner 110 which is used when activating the burner. The oil burner 110 is used not only when activating the burner but also during a low-load operation. In the burner of the type in which the oil burner is not equipped, a support (not shown) may be provided at the position where the oil burner is to be equipped, and the pulverized coal concentration-adjusting device 114 may be mounted on this support.

Figure 23:
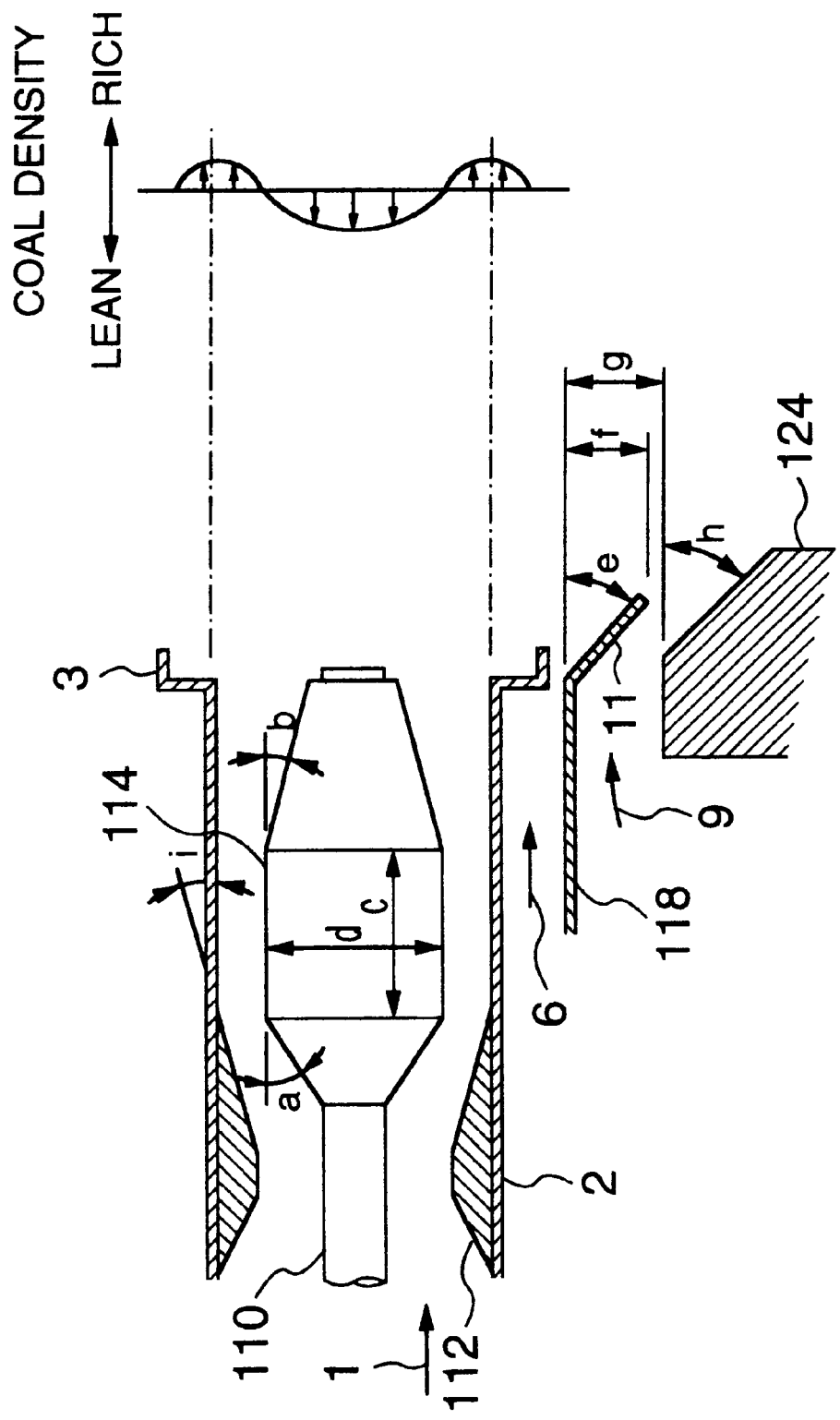
FIG. 23 is a vertical cross-sectional view showing a further embodiment of a combustion burner of the invention.

As specifically shown in FIG. 23, the pulverized coal concentration-adjusting device 114 is mounted on the outer peripheral surface of the oil burner 110 has the same form as one obtained by revolving the trapezoidal plate about an axis of the oil burner 110. An upstream-side slanting or tapering portion of the pulverized coal concentration-adjusting device 114 has an inclination angle a of 20°, and a downstream-side slanting or tapering portion thereof has an inclination angle b of 15°, and the dimension ratio r1 of an outer diameter a of a parallel portion thereof (parallel to the inner peripheral surface of the mixture nozzle 2 and the axis of the burner) to a length c thereof in the direction of flow of the gas is 1 (r1=c/d=1).

If the length c of the parallel portion of the pulverized coal concentration-adjusting device 114 is too long, the wind box 5 need to be increased in size, and this is disadvantageous from the viewpoint of the cost. The dimension of the outer diameter d of the parallel portion is limited by the diameter of the mixture nozzle 2. The outer diameter d is usually about 0.7 of the diameter of the mixture nozzle 2. In order to rectify the pulverized coal flow 1 concentrated by the upstream-side slanting surface of the pulverized coal concentration-adjusting device 114, the ratio r1 (=c/d) of the outer diameter d of the parallel portion of the pulverized coal concentration-adjusting device 114 to the length c thereof is preferably $1 \leq r1 \leq 2$.

It is also necessary that the angle i of inclination of a downstream-side slanting or tapering portion of the Venturi 112 formed on the inner peripheral surface of the mixture nozzle 2 with respect to the axis of the burner should be smaller than the inclination angle a of the upstream-side slanting portion of the pulverized coal concentration-adjusting device 114 (i<a).

In this embodiment, the inclination angle a is about 20°, and the inclination angle i is about 10°.

The pulverized coal concentration-adjusting device 114 has the function of enhancing the concentration of the pulverized coal in the mixture fluid flowing in the vicinity of the inner peripheral surface of the mixture nozzle 2 by means of the upstream-side slanting portion. The inclination angle a of the upstream-side slanting surface of the pulverized coal concentration-adjusting device 114 is preferably 15° to 25°. If the inclination angle a is less than 15°, the effect of drawing the pulverized coal particles toward the inner peripheral surface of the mixture nozzle 2 is lowered, and if the inclination angle a is more than 25°, a larger amount of the pulverized coal particles impinge on the inner peripheral surface of the mixture nozzle 2, so that this inner peripheral surface can be worn more easily.

In order to form the flame of high temperature at the outlet of the burner, it is important to increase the pulverized coal concentration in the vicinity of the flame stabilizer ring 3 and also to gradually decrease the flow velocity of the pulverized coal flow 1 so that the pulverized coal flow 1 will not be separated from the outer surface of the distal end portion (downstream-side portion) of the pulverized coal concentration-adjusting device 114. In order to achieve these functions, the inclination angle b of the downstream-side slanting surface of the pulverized coal concentration-adjusting device 114 is preferably set to 6° to 18° so as to gradually lower the flow velocity of the pulverized coal flow 1. Even if the inclination angle b is less than 6°, the equivalent concentration effect can be obtained, but the depth of the pulverized coal concentration-adjusting device 114, as well as the depth of the wind box 5, is unduly increased, which increases the size of the furnace. If the inclination angle b is more than 18°, the separation is liable to occur.

The inclination angle a and the inclination angle b can be set independently of each other.

With respect to the function of the parallel portion of the pulverized coal concentration-adjusting device 114, after the pulverized coal flow 1 is deflected by the upstream-side slanting surface thereof, the pulverized coal flow 1 whose concentration of the pulverized coal particles is increased in the vicinity of the inner peripheral surface of the mixture nozzle 2 is caused to flow stably for a while in a direction parallel to the inner peripheral surface of the mixture nozzle 2. With the provision of this parallel portion, the pulverized coal flow 1 can be rectified in a stable manner by the pulverized coal concentration-adjusting device 114 even if the pulverized coal concentration of the fuel and the nature of the coal vary, and the combustion load is abruptly changed.

As is clear from the coal density shown in FIG. 23, the concentration of the pulverized coal is relatively high in the vicinity of the flame stabilizer ring 3, and is relatively low at the center portion of the burner.

By suitably determining the inclination angles of the slanting surfaces of the pulverized coal concentration-adjusting device 114 and the dimensions of the parallel portion thereof, and also by suitably determining the inclination angle i of the downstream-side slanting portion of the Venturi 112, the concentration of the pulverized coal in the mixture fluid can be increased in the vicinity of the flame stabilizer ring 3, and also the mixture fluid can be supplied at low speed to the outlet of the burner, so that the ignition of the fuel and the flame stabilization can be positively achieved in a stable manner at the outlet of the burner.

In this embodiment, the secondary air separation annular disk 116 is provided for directing the flow of the secondary air 6 toward the outer periphery of the distal end of the mixture nozzle 2 (see FIGS. 22 and 24). The disk 116 has the function of separating the secondary air 6 from the burner flame, and also has the function of mixing the secondary air 6 with the hot gas immediately downstream of the flame stabilizer ring 3, thereby enhancing the ignition and flame stabilization ability of the flame stabilizer ring 3. As shown in FIGS. 21 and 22, the radially-inward portion of the flow of the secondary air 6 is interrupted by the disk 116, and injection ports 25 of the gas injection nozzles 24 are opened downstream of the disk 116. With this arrangement, the jets 26 from the gas injection nozzles 24 is not be directly influenced by the secondary air 6, so that the pulverized coal carrying action due to the jets 26 is promoted.

Figure 27:
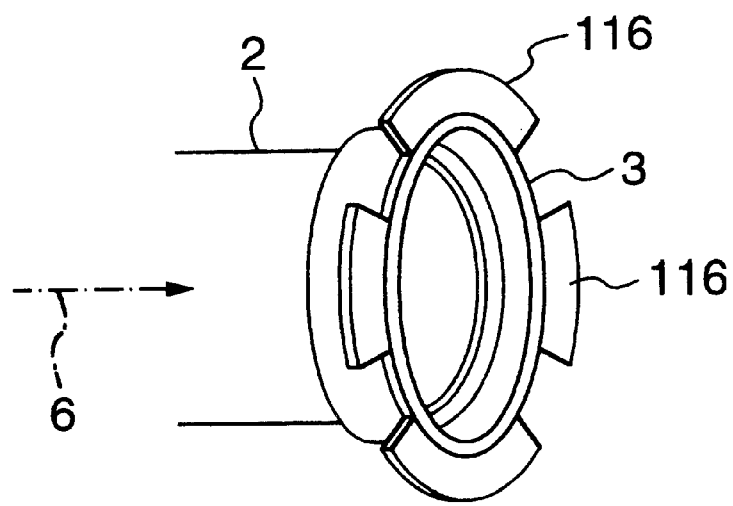
FIGS. 27 and 28 are perspective views showing modified secondary air separation plates, respectively.

FIG. 25 shows a further embodiment in which instead of the separation disk 116, a plurality of separation plates 116 are used. In this embodiment, there are provided the secondary air separation plates 116 for circumferentially dividing the flow of the secondary air 6 into four sections at the outer periphery of the distal end of the outlet of the mixture nozzle (see FIGS. 26 and 27). By dividing the flow of the secondary air 6 by the secondary air separation plates 116, the flow of the secondary air 6 is mixed with the hot gas, produced immediately after the flame stabilizer ring 3, at a region downstream of the secondary air separation plates 116, so that the fuel ignition and flame stabilization ability of the flame stabilizer ring 3 is enhanced. As shown in FIG. 26, at those regions where the secondary air 6 freely flows between the secondary air separation plates 116, the momentum of the secondary air 6 is relatively large, and therefore these regions have the effect of promoting the separation of the flow of the secondary air 6 from the burner flame. If the flow of the secondary air 6 is mixed with the mixture fluid 1 too early at that region of the furnace 4 disposed immediately after the outlet of the burner, the low-NOx combustion (reduction combustion) can not be achieved, and therefore it is effective to separate the burner flame from the flow of the secondary air 6.

Figure 28:
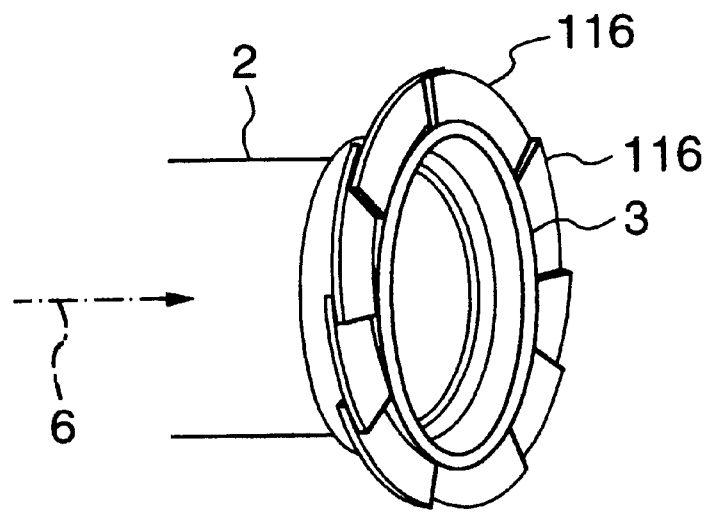

As shown in FIG. 28, there may be used an arrangement in which secondary air separation plates 116 are inclined at a predetermined angle with respect to the axis of the mixture nozzle 2, and overlap one another in the circumferential direction. With this arrangement, a slit-like gap is formed between any two adjacent plates 116. The secondary air 6 is injected from these gaps into the interior of the furnace. In this case, although the momentum of the secondary air 6, injected from the gaps, is small as compared with that of the secondary air 6 supplied into the furnace through the gaps between the plates 116 of FIG. 27, since the secondary air is supplied into the furnace in a film-like manner, the cooling of the secondary air separation plates 116 as well as the prevention of deposition of ash thereon can be effected.

Figure 29:
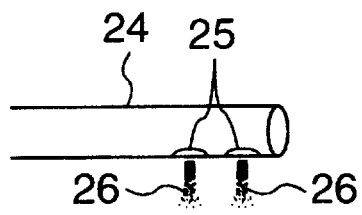
FIGS. 29 to 34 are perspective views showing modified injection nozzles, respectively.

As shown in FIG. 29, in this embodiment, each of gas injection nozzles 24 has two round (circular) openings or holes 25 formed through a peripheral wall of a distal end portion of the nozzle having a closed distal end, the two openings 25 being arranged adjacent to each other in the longitudinal direction. The amount of injection of the gas from the openings 25 is 2% of the amount of the primary air.

Figure 30:
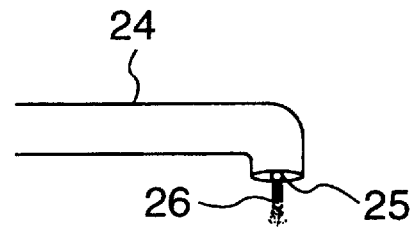
Figure 31:
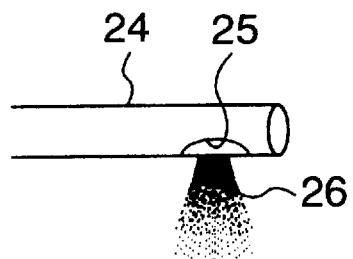
Figure 32:
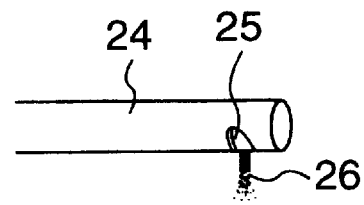
Figure 33:
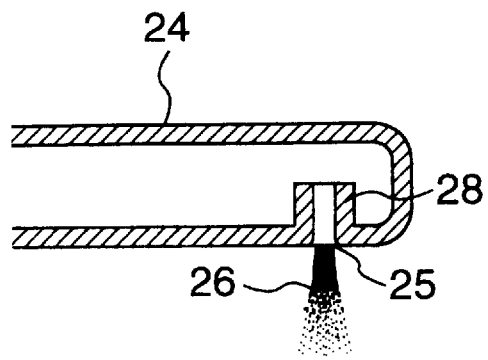

FIGS. 30 to 32 show modified openings 25. The opening 25 may be formed at a distal end of a bent nozzle (FIG. 30). The opening 25 of an oval shape having a longer axis extending parallel to or perpendicular to the axis of the nozzle may be formed through a peripheral wall of a distal end portion of the nozzle having a closed distal end (FIGS. 31 to 32). By forming a guide 28 at the peripheral edge of the opening 25 as shown in FIG. 33, the force of injection of the gas from the opening 25 can be increased.

Figure 34:
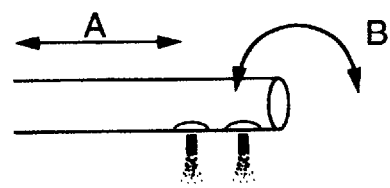

The gas injection nozzles 24 can be moved in the direction A (FIG. 34) of the axis of the burner so that the distance between the jet port 25 of each gas injection nozzle 24 and the outlet of the burner in the direction of the axis of the burner (that is, the distance from the jet port 25 to the flame stabilizer ring 3) can be changed in accordance with the nature of the fuel, the burner load combustion conditions, the number of stages of burners arranged in the combustion furnace, and so on. Each of the gas injection nozzles 24 can be rotated in a circumferential direction B (FIG. 34) about its axis so as to change the direction of injection of the gas. For example, when high fuel ratio coal or coarse pulverized coal, which is not so excellent in ignition and flame stabilization properties, is used, it is effective to direct the jets from the gas injection nozzles 24 toward the upstream side of the mixture nozzle 2.

Figure 35:
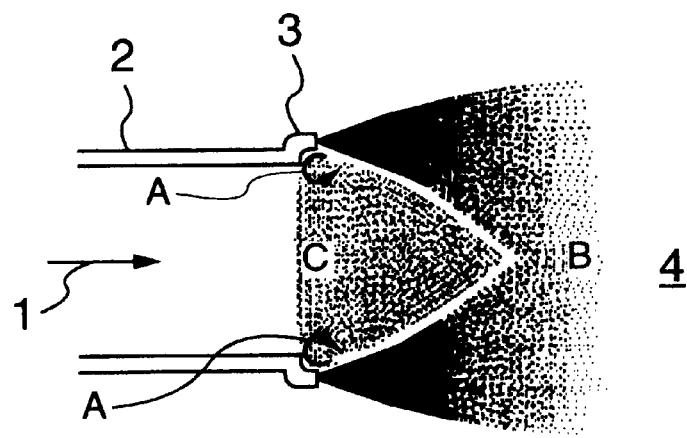
FIGS. 35 and 36 are views showing conditions of the flame, respectively.
Figure 36:
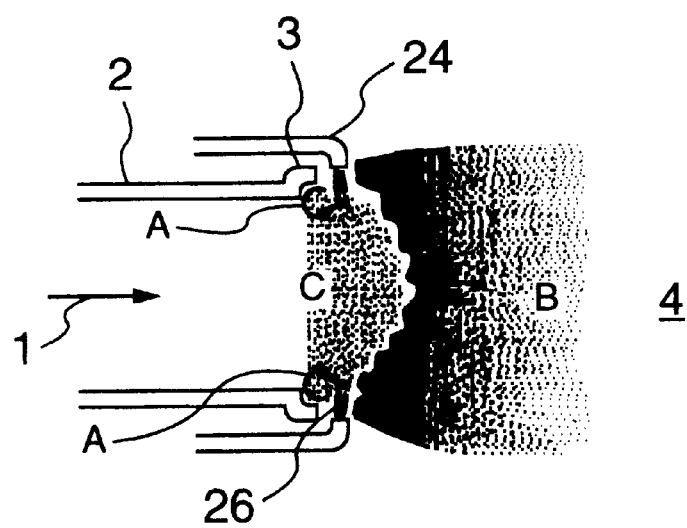

The effects of stabilization of the flame by the gas jets will be described with reference to FIGS. 35 and 36.

Circulation flows A of hot gas are present at a region downstream of the flame stabilizer ring 3 provided at the outlet portion of the mixture nozzle 2, and promote the ignition of the fuel and the flame stabilization in the vicinity of the flame stabilizer ring 3. In a conventional construction of FIG. 35 in which any gas injection nozzle 24 is not provided, a large unignition region C is formed inside an ignition region B. On the other hand, in the embodiment of the invention shown in FIG. 36, the air jets 26, injected respectively from the gas injection nozzles 24 toward the center portion of the mixture nozzle 2, achieve the hot gas-carrying action, and therefore part of the circulation flows A flow along the air jets 26 into the mixture fluid (pulverized coal flow) 1, so that the ignition and flame stabilization performance therein is enhanced.

Therefore, in this embodiment, the unignition region C is made smaller as compared with the conventional construction, and the temperature of the flame at the reduction region relatively rises, so that the Nox reduction rate is enhanced. And besides, the disturbance of the mixture fluid 1 is increased by the air jets 26, and this is effective for enhancing the combustion rate after the ignition.

In order to enhance the reduction of Nox, it is effective to sufficiently reduce Nox into $N_2$ in the reduction flame of high temperature and then to charge the combustion air in an amount corresponding to the shortage, thereby completing the combustion. Therefore, it is required to separate the tertiary air 9 from the flame.

In this connection, the angle e of inclination of the guide 11 and the dimension ratio r2=f/g (see FIG. 23) becomes important, where f represents a slanting width of the guide 11 perpendicular to the axis of the burner, and g represents the distance between an opening of the burner throat 124 (which is disposed at a starting end of the slanting surface thereof, and is parallel to the axis of the burner) and a portion of the secondary sleeve 118 parallel to the axis of the burner. The inclination angle e of the guide 11 is the angle of inclination of its flaring distal end portion with respect to the axis of the burner.

If the inclination angle e of the guide 11 is too large, the pulverized coal flow 1 in the mixture nozzle 2 can not be satisfactorily mixed with the flow of the secondary air 6, and therefore the inclination angle e is preferably 35° to 55°. An angle h of inclination of the slanting portion of the burner throat 124, disposed at the outlet portion of the burner, with respect to the axis of the burner is preferably about 35° to about 55°.

If the inclination angles e and h are both too large, the tertiary air is spaced too much from the burner flame obtained as a result of the burning of the pulverized coal, and the mixing can not be effected satisfactorily, so that the stable combustion flame can not be obtained. If the inclination angles e and h are both too small, the effect of separating the burner flame from the flow of the tertiary air 9 can not be achieved satisfactorily, and the flow of the tertiary air 9 is supplied in an excessive amount into the burner flame, so that the low-Nox combustion of the pulverized coal fuel can not be achieved.

Preferably, the dimension ratio r2 (=f/g) is $0.5 \leq r2 \leq 1$. If f/g is less than 0.5, the effect of separating the burner flame from the flow of the tertiary air 9 can not be achieved satisfactorily and if f/g is more than 1, the flow of the tertiary air 9 impinges on the guide 11, and can not effectively flow into the furnace 4.

Therefore, in this embodiment, the inclination angle e of the guide 11 is set to 45°, and the angle h of inclination of the slanting portion of the burner throat 124, disposed at the outlet portion of the burner, with respect to the axis of the burner is set to 45°, and the dimension ratio r2 (=f/g) is set to 0.8.

Figure 37:
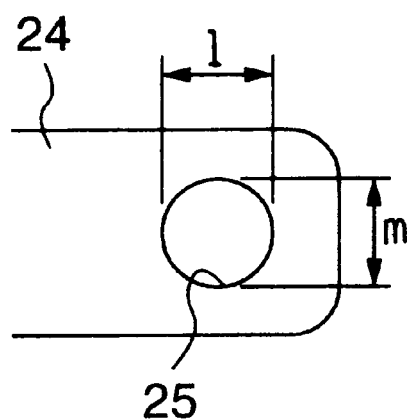
FIGS. 37 to 39 are bottom views showing injection openings.
Figure 38:
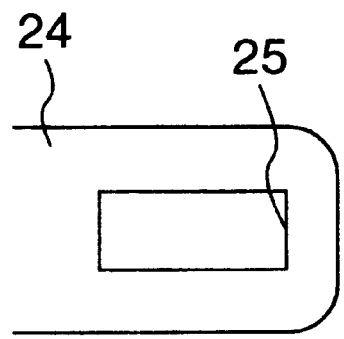

The gas injection openings 25 may have any suitable shape in so far as the ratio r3 (=1/m) (FIG. 37) of a length 1 of the opening 25 in the direction of the axis of the injection nozzle 24 to a length m of the opening 25 in the direction of the diameter of the injection nozzle 24 is not less than 1. For example, the opening 25 may be rectangular as shown in FIG. 38. By providing the injection openings 25 which satisfy r3≧1, there is achieved an advantage that the jets 25 can reach the center portion of the burner without being much influenced by the flow of the mixture fluid 1.

Figure 39:
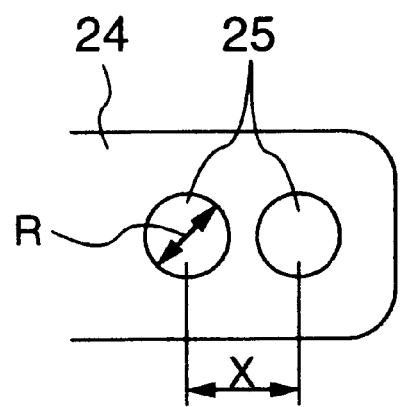

In the case where two or more injection openings 25 are formed in the injection nozzle 24 (FIG. 39), it is preferred that the distance X between the axes of the injection openings 25 is not more than 2.5 times of the diameter R of the opening 25. If the two gas injection ports are spaced too much from each other, two separate jets are formed. On the other hand, if X/R≦2.5, the two jets in close proximity to each other are combined into one jet immediately after the two jets injected respectively from the openings 25, and therefore there is no need to increase the flow rate of the injection gas, and besides the jet is injected from the apparently-large injection port, and the jet, having a large penetrating force, can be produced.

When, not less than two injection openings are used, and the apparent bore diameter of the injection opening is increased without changing the flow velocity of the gas injected from each injection opening, the penetrating force of the gas jet can be increased. When the number of the injection openings is increased, while keeping the sum of the areas of the injection openings constant, in order to increase the apparent diameter, the number of the injection openings is not limited. In such case, preferably, the plurality of injection openings are arranged along the length of the gas injection nozzle (that is, in the direction of the axis of the nozzle) so that the gas jets will not receive much resistance from the flow of the mixture fluid.

When the flow velocity of the gas injected from the gas injection opening is not less than three times higher than the flow velocity of the mixture fluid, the gas jets, injected respectively from the gas injection openings, enter the flow of the mixture fluid toward the center portion thereof with the sufficient penetrating force, thereby effectively reducing the unignition region of the flame.

Figure 40:
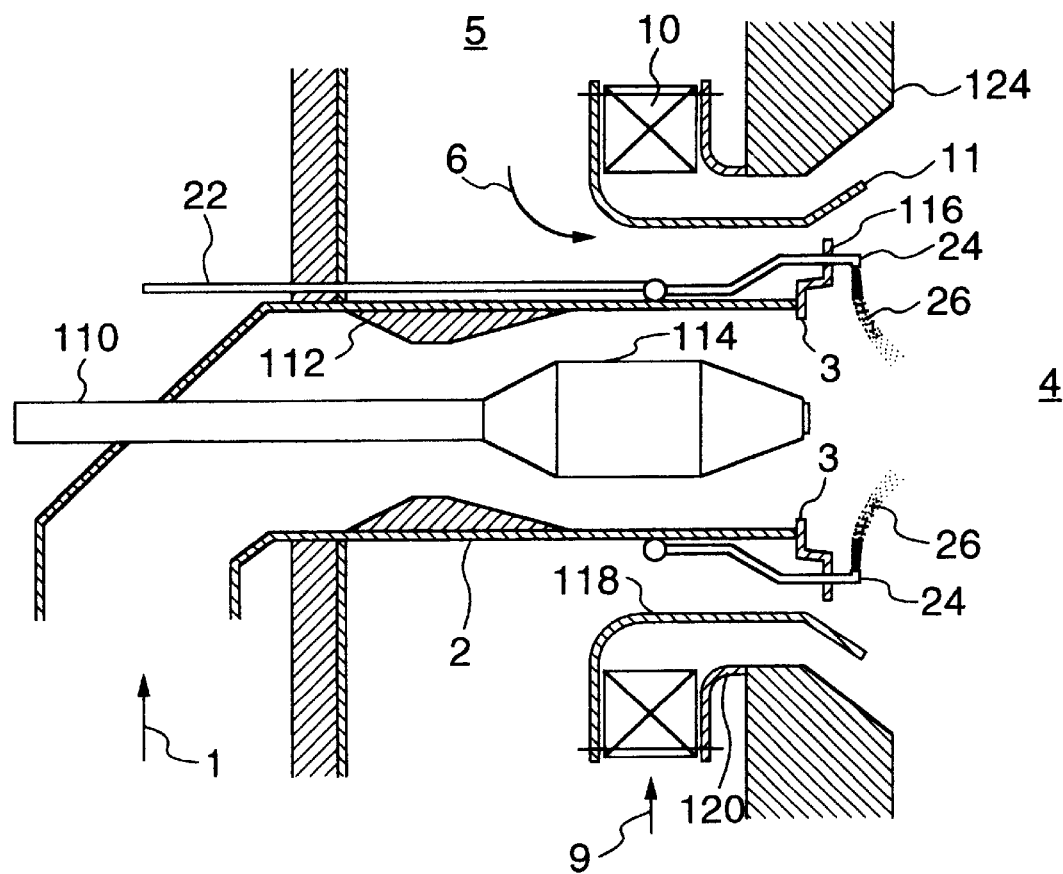
FIG. 40 is a vertical cross-sectional view showing a further embodiment of a combustion burner of the invention.

In a further embodiment of a burner of the invention shown in FIG. 40, a secondary sleeve 118 and a tertiary sleeve 120 are rounded or curved at their corner portions in their cross-sectional configuration. With this construction, the secondary air 6 and the tertiary air 9 can be supplied into the furnace without undergoing a pressure loss from the sleeve 118 and the sleeve 120, and the necessary flow velocity of the combustion air flows can be obtained with the minimum pressure loss.

In this burner, there is no need to provide the damper 122 (FIG. 25) on the secondary sleeve 118, and the supply ratio of the secondary air 6 to the tertiary air 9 is adjusted by a tertiary air resistor 10.

In the burner of FIG. 40, combustion air is supplied at high speed to a region around the pulverized coal flow, and also the pulverized coal particles are gathered in the vicinity of an inner peripheral surface of an inlet nozzle 2, and therefore the ignition of the burner and the flame stabilization function are achieved more effectively.

Figure 41:
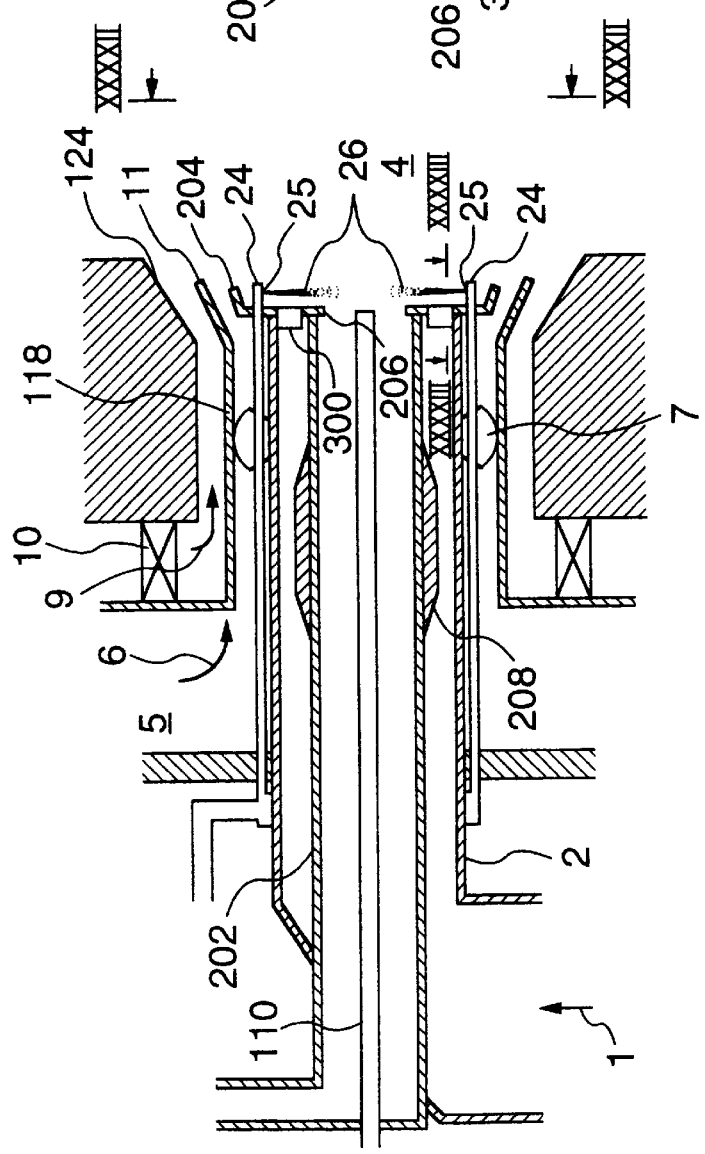
FIG. 41 is a vertical cross-sectional view showing a further embodiment of a combustion burner of the invention.

A burner shown in FIG. 41 comprises a mixture nozzle 2, and a rod member extending within the mixture nozzle 2.

Here, the rod member is a tube 202. A mixture fluid 1 containing pulverized coal and conveyor air flows through a passage defined by the mixture nozzle 2 and the tube 202. Combustion air flows in the tube 202. An oil burner 110 extends within the tube 202 toward a furnace 4. An outer flame stabilizer 204 is provided at a distal end of the mixture nozzle 2, and an inner flame stabilizer 206 is provided at a distal end of the tube 202.

A concentrator 208 is provided on an outer peripheral surface of the tube 202, and divides the mixture fluid 1 into a mixture fluid portion of a high pulverized coal concentration flowing at a radially-outward region and a mixture fluid portion of a low pulverized coal concentration flowing at a radially-inward region.

Figure 43:
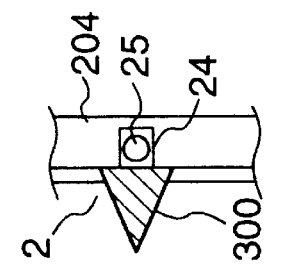
FIG. 43 is a cross-sectional view taken along the line XXXXIII—XXXXIII of FIG. 41.
Figure 42:
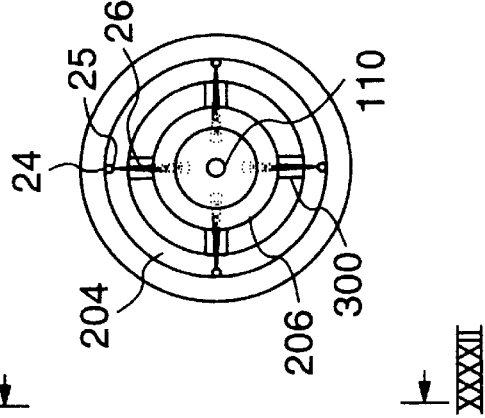
FIG. 42 is a front-elevational view as seen along the line XXXXII—XXXXII of FIG. 41.

Four bridge portions 300 are provided to be equiangularly spaced circumferentially, and extend radially to connect the outer flame stabilizer 204 with the inner flame stabilizer 206 (FIG. 42). As shown in FIG. 43, each bridge portion 300 has a V-shaped cross-section tapering toward the upstream side. Therefore, the bridge portions 300 partially interrupt the flow of the mixture fluid 1, but will not be worn by the mixture fluid. Each bridge portion 300 may have a U-shaped cross-section or a semi-circular cross-section decreasing in width progressively toward the upstream side, and the number of the bridge portions 300 is not limited to four.

As means for partially interrupting the flow of the mixture fluid, air jets 26 may be injected respectively from openings 25 of gas injection nozzles 24 toward the center portion of the mixture nozzle 2, as in the above embodiments.

As shown in FIG. 41, the bridge portions and the air jets may be used in combination in such a manner that the air jets are aligned with the bridge portions, respectively.

Figure 44:
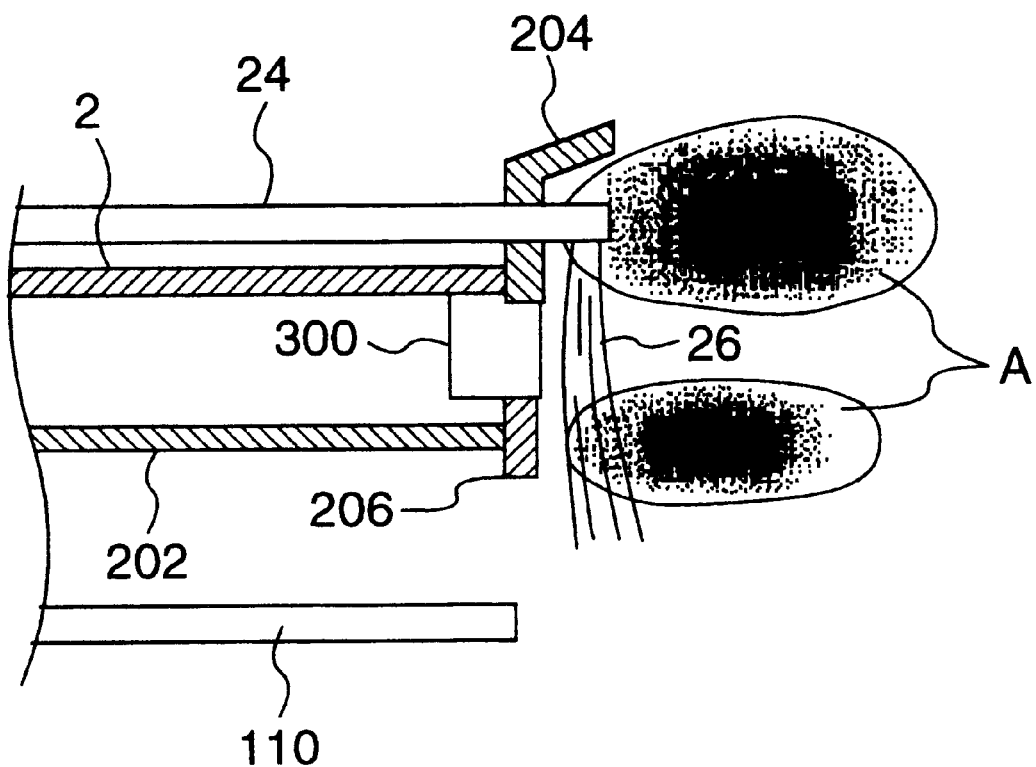
FIG. 44 is a fragmentary cross-sectional view showing the flow of gas in the vicinity of a bridge portion.

As shown in FIG. 44, regions A, at which circulation flows due to turbulence eddies, are formed downstream of the outer flame stabilizer 204 and the inner flame stabilizer 206. The pulverized coal of a relatively small particle size is drawn into the regions A, and is burned to produce combustion gas of high temperature. This high-temperature combustion gas flows from the outer flame stabilizer 204 to the inner flame stabilizer 206 along the bridge portions 300, and promotes the ignition of the mixture fluid at the surface of the inner flame stabilizer 206.

Figure 45:
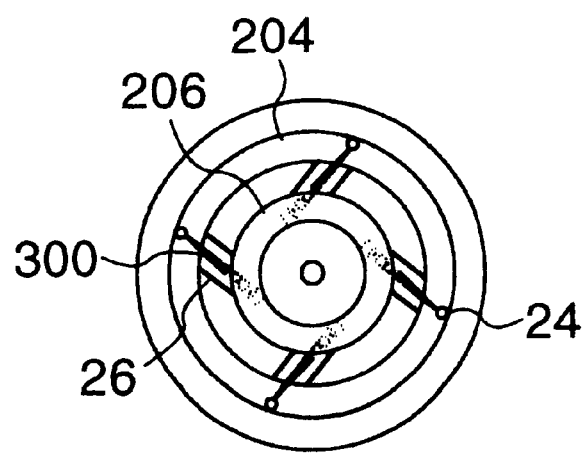
FIG. 45 is a front-elevational view showing modified bridge portions.

As shown in FIG. 45, by extending the bridge portions 300, as well as the air jets 26, in directions tangential to the inner flame stabilizer 206, the ignition is promoted over the entire area of the surface of the inner flame stabilizer 206.

In the above description, identical reference numerals denote the identical members or the members achieving the similar effects, and explanation thereof is omitted.

INDUSTRIAL APPLICABILITY

The present invention can be applied to a combustion burner used in a combustion apparatus such as a boiler, a heating furnace and a hot blast-producing furnace.

What is claimed is:

1. A combustion burner comprising:
   a mixture nozzle defining a mixture fluid passage through which a mixture fluid containing a powdered solid fuel and a conveyor gas for transferring said solid fuel flows toward a furnace;
   a gas passage, which is provided to surround said mixture nozzle, and through which a combustion oxygen-containing gas flows;
   a flame stabilizer provided at a distal end of said mixture nozzle; and
   separation means provided at a distal end of said flame stabilizer on the side of said gas passage for promoting separation of said combustion oxygen-containing gas flowing through said gas passage and said mixture fluid.

2. The combustion burner according to claim 1, further comprising an air nozzle provided in the vicinity of said flame stabilizer, and wherein a gas from said air nozzle is jetted toward an interior of said mixture nozzle.

3. The combustion burner according to claim 2, wherein said air nozzle is provided to be oriented in a direction tangential to an inner periphery of the distal end of said mixture nozzle.

4. The combustion burner according to claim 2, wherein the jetting speed of a gas jetted from said air nozzle is at least three times the flow speed of said mixture fluid flowing in said mixture nozzle.

5. The combustion burner according to claim 2, wherein the sum of widths of said gas jetted from said air nozzle is substantially equal to 10% to 50% of the length of a periphery of a tip end of said mixture nozzle.

6. The combustion burner according to claim 2, all wherein said air nozzle jets a gas toward an upstream side of the interior of said mixture nozzle.

7. The combustion burner according to claim 2, wherein the flow rate of the gas jetted from said air nozzle, the position to which the gas is jetted, and the direction of the gas jetted are variable.

8. The combustion burner according to claim 2, wherein the gas jetted from said air nozzle is introduced from a low-temperature portion or a high-temperature portion of a system for supplying the conveyor gas for transferring said powdered solid fuel.

9. The combustion burner according to claim 8, wherein the gas jetted from said air nozzle is introduced from the high-temperature portion of the system for supplying the conveyor gas for transferring said powdered solid fuel during operation of the burner and from the low-temperature portion of the system during suspension of the burner.

10. The combustion burner according to claim 2, wherein the gas jetted from said air nozzle is an oxygen-rich air having an oxygen concentration of at least 21%.

11. The combustion burner according to claim 2, further comprising a flow control device provided in a system for supplying the gas jetted from said air nozzle.

12. The combustion burner according to claim 2, wherein the gas jetted from said air nozzle has a variable flow rate.

13. The combustion burner according to claim 2, further comprising at lease one gas jetting port arranged axially on said air nozzle such that a dimensional ratio of an axial length of a major axis of a jetting opening of said air nozzle to a length of a minor axis of the jetting opening in a diametrical direction is less than 1.

14. The combustion burner according to claim 13, wherein the jetting opening of said air nozzle is circular or elliptical in shape.

15. The combustion burner according to claim 13, wherein said air nozzle includes two or more jetting openings, and a distance between the centers of the jetting openings is at most 2.5 times the diameter of the jetting openings.

16. The combustion burner according to claim 13, wherein the gas jetted from said air nozzle is a high temperature air raised to a temperature of said mixture fluid or higher.

17. The combustion burner according to claim 13, wherein the jetting opening of said air nozzle is positionally variable in an axial direction of said air nozzle, and/or the orientation of the jetting opening is movable relative to the axis of said mixture nozzle.

18. The combustion burner according to claim 2, wherein the jetting opening of said air nozzle is disposed in extensions of normal lines extended to the respective flame stabilizing plates from a central axis of said burner.

19. The combustion burner according to claim 1, wherein an outer periphery of said flame stabilizer is L-shaped in cross section.

20. The combustion burner according to claim 19, further comprising a flame stabilizer having a saw-toothed flame stabilizing plate mounted to an inner periphery of the distal end of said mixture nozzle.

21. The combustion burner according to claim 1, further comprising an inner flame stabilizer provided within said mixture nozzle.

22. The combustion burner according to claim 21, further comprising a rod-shaped member provided centrally radially of said mixture nozzle, and wherein said inner flame stabilizer is provided in the vicinity of a distal end of said rod-shaped member.

23. The combustion burner according to claim 1, further comprising a rod-shaped member provided centrally radially of said mixture nozzle.

24. The combustion burner according to claim 23, wherein said rod-shaped member is a hollow member having a bore, through which bore a gas flows.

25. The combustion burner according to claim 24, wherein a part of said combustion oxygen-containing gas is metered and made to flow through an interior of said rod-shaped member.

26. The combustion burner according to claim 1, wherein said separation means comprises a ring-shaped separation plate provided at a distal end of said flame stabilizer on the side of said gas passage to serve as a means for separation of said combustion oxygen-containing gas flowing through said gas passage and said mixture fluid.

27. The combustion burner according to claim 26, further comprising a guide portion provided in said gas passage for deflecting a flow in said gas passage radially outwardly, and wherein an upstream end of said guide portion relative to said gas passage is disposed upstream of said burner relative to a position where said separation plate is provided.

28. The combustion burner according to claim 1, further comprising a guide portion provided in said gas passage for deflecting a flow therein radially outwardly.

29. The combustion burner according to claim 28, further comprising a burner throat provided on a wall surface of said furnace, wherein an inclination of said guide portion relative to a central axis of said burner is in a range of 35° to 55°.

30. The combustion burner according to claim 28, further comprising a burner throat provided on a wall surface of said furnace, wherein an inclination of an inclined surface of said burner throat relative to a central axis of said burner is in a range of 35° to 55°.

31. The combustion burner according to claim 28, further comprising a burner throat provided on a wall surface of said furnace, wherein a dimensional ratio of a width of said guide portion in a direction perpendicular to a central axis of said burner, to a distance between a starting end of an inclined surface of said burner throat and a portion of said guide portion in parallel to the central axis of said burner is in a range of 0.5 to 1.

32. The combustion burner according to claim 1, further comprising a guide portion for deflecting a flow of said combustion oxygen-containing gas radially outwardly, and a swirl portion for imparting a swirling motion to said combustion oxygen-containing gas, said guide portion and said swirl portion being provided in at least a part of said gas passage.

33. The combustion burner according to claim 1, wherein a flow passage area of the distal end of said mixture nozzle gradually decreases toward the distal end, and further comprising a swirl portion for imparting a swirling motion to said combustion oxygen-containing gas.

34. The combustion burner according to claim 1, further comprising an adjusting device provided in said mixture nozzle for adjusting the concentration of said mixture fluid.

35. The combustion burner according to claim 34, wherein said concentration adjusting device comprises slanting opposite end portions and a parallel portion arranged between said slanting portions to be in parallel to an inner wall surface of said mixture nozzle, and wherein an inclination of said slanting portion of said concentration adjusting device on an upstream side of said mixture nozzle relative to a central axis of said burner is in a range of 15° to 25°, an inclination of said slanting portion of said concentration adjusting device on a downstream side of said mixture nozzle relative to a central axis of said burner is in a range of 6° to 18°, and a dimensional ratio of an outer diameter of said parallel portion to a length of said parallel portion along the direction of gas flow is in a range of 1 to 2.

36. The combustion burner according to claim 34, further comprising a Venturi portion provided on the inner wall surface of said mixture nozzle upstream of said concentration adjusting device to constrict a flow of said mixture fluid.

37. The combustion burner according to claim 1, wherein said gas passage has a streamlined shape.

38. A system comprising a combustion burner comprising:

- a mixture nozzle defining a mixture fluid passage through which a mixture fluid containing a powdered solid fuel and a conveyor gas for transferring said solid fuel flows toward a furnace;
- a gas passage, which is provided to surround said mixture nozzle, and through which a combustion oxygen-containing gas flows;
- a flame stabilizer provided at a distal end of said mixture nozzle; and
- separation means provided at a distal end of said flame stabilizer on the side of said gas passage for promoting separation of said combustion oxygen-containing gas flowing through said gas passage and said mixture fluid; and
- a fan or a compressor for supplying the gas jetted from said air nozzle, wherein the gas is cooled air or heated air from an outlet of a preheater provided for air preheating.

* * * * *